(12) United States Patent
Naito et al.

(10) Patent No.: US 9,942,929 B2
(45) Date of Patent: Apr. 10, 2018

(54) RADIO COMMUNICATION DEVICE, RADIO COMMUNICATION SYSTEM, RADIO COMMUNICATION METHOD, AND PROGRAM

(75) Inventors: Masahiko Naito, Tokyo (JP); Katsutoshi Itoh, Tokyo (JP); Hideyuki Suzuki, Tokyo (JP); Erika Saito, Tokyo (JP); Tomoya Yamaura, Tokyo (JP); Natsuki Itaya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1484 days.

(21) Appl. No.: 12/907,351

(22) Filed: Oct. 19, 2010

(65) Prior Publication Data

US 2011/0122835 A1    May 26, 2011

(30) Foreign Application Priority Data

Nov. 24, 2009 (JP) ................ P2009-266303

(51) Int. Cl.
*H04W 4/00* (2009.01)
*H04W 76/02* (2009.01)
(Continued)

(52) U.S. Cl.
CPC .......... *H04W 76/023* (2013.01); *H04W 8/005* (2013.01); *H04W 76/043* (2013.01)

(58) Field of Classification Search
USPC ....................................................... 370/329
See application file for complete search history.

(56) References Cited

U.S. PATENT DOCUMENTS

2009/0181613 A1* 7/2009 Chen ................. G08C 17/00
455/3.06
2011/0082939 A1* 4/2011 Montemurro et al. ....... 709/227

FOREIGN PATENT DOCUMENTS

JP    2004-363645    12/2004
JP    2006-128949    5/2006
(Continued)

OTHER PUBLICATIONS

"IEEE Std 802.11™-2007, Part 11: Wireless LAN Medium Access Control (MAC) and Physical Layer (PHY) Specification", Approved, Mar. 8, 2007.*
(Continued)

*Primary Examiner* — Chirag Shah
*Assistant Examiner* — Majid Esmaeilian
(74) *Attorney, Agent, or Firm* — Paratus Law Group, PLLC

(57) ABSTRACT

There is provided a radio communication device including a reception unit which receives information indicating a connection state or a communication capability of another radio communication device which the radio communication device attempts to connect to, and a selection unit which selects, depending on the information received by the reception unit, which communication is to be performed from among first communication in which a direct connection to such other radio communication device is established and direct communication with such other radio communication device is performed, second communication in which a connection to such other radio communication device via a base station is established and direct communication with such other radio communication device is performed, and third communication in which a connection to such other radio communication device via the base station is estab- (Continued)

lished and indirect communication with such other radio communication device via the base station is performed.

20 Claims, 21 Drawing Sheets

(51) Int. Cl.
*H04W 8/00* (2009.01)
*H04W 76/04* (2009.01)

(56) References Cited

FOREIGN PATENT DOCUMENTS

| JP | 2007-096862 | 4/2007 |
|----|-------------|--------|
| JP | 2007-104600 | 4/2007 |
| JP | 2008-283590 | 11/2008 |
| JP | 2009-267936 | 11/2009 |
| JP | 2010-504693 | 2/2010 |
| WO | WO2005/125113 | 12/2005 |

OTHER PUBLICATIONS

Aug. 27, 2013, Japanese Office Action in related JP application No. 2009-266303.

* cited by examiner

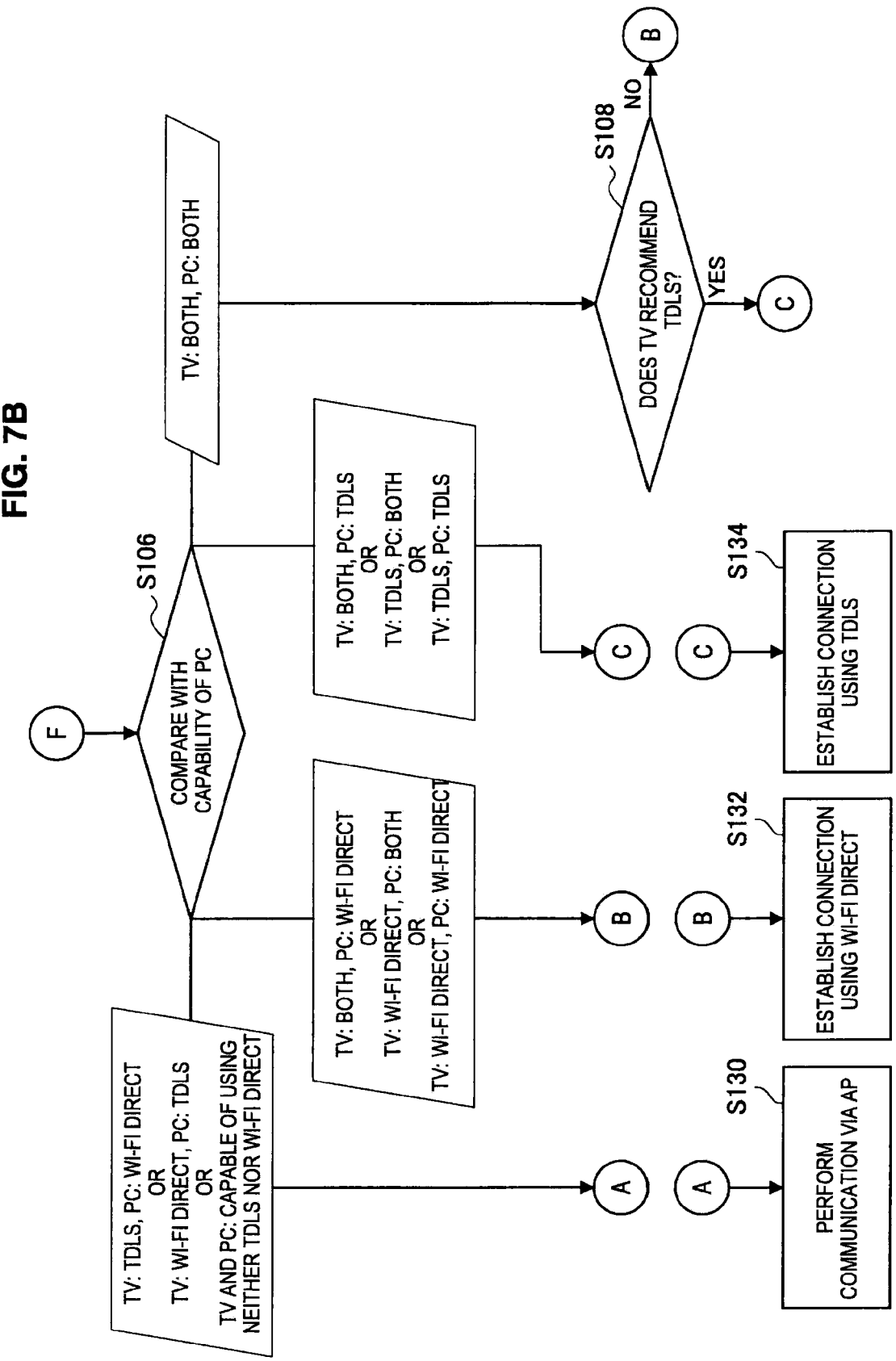

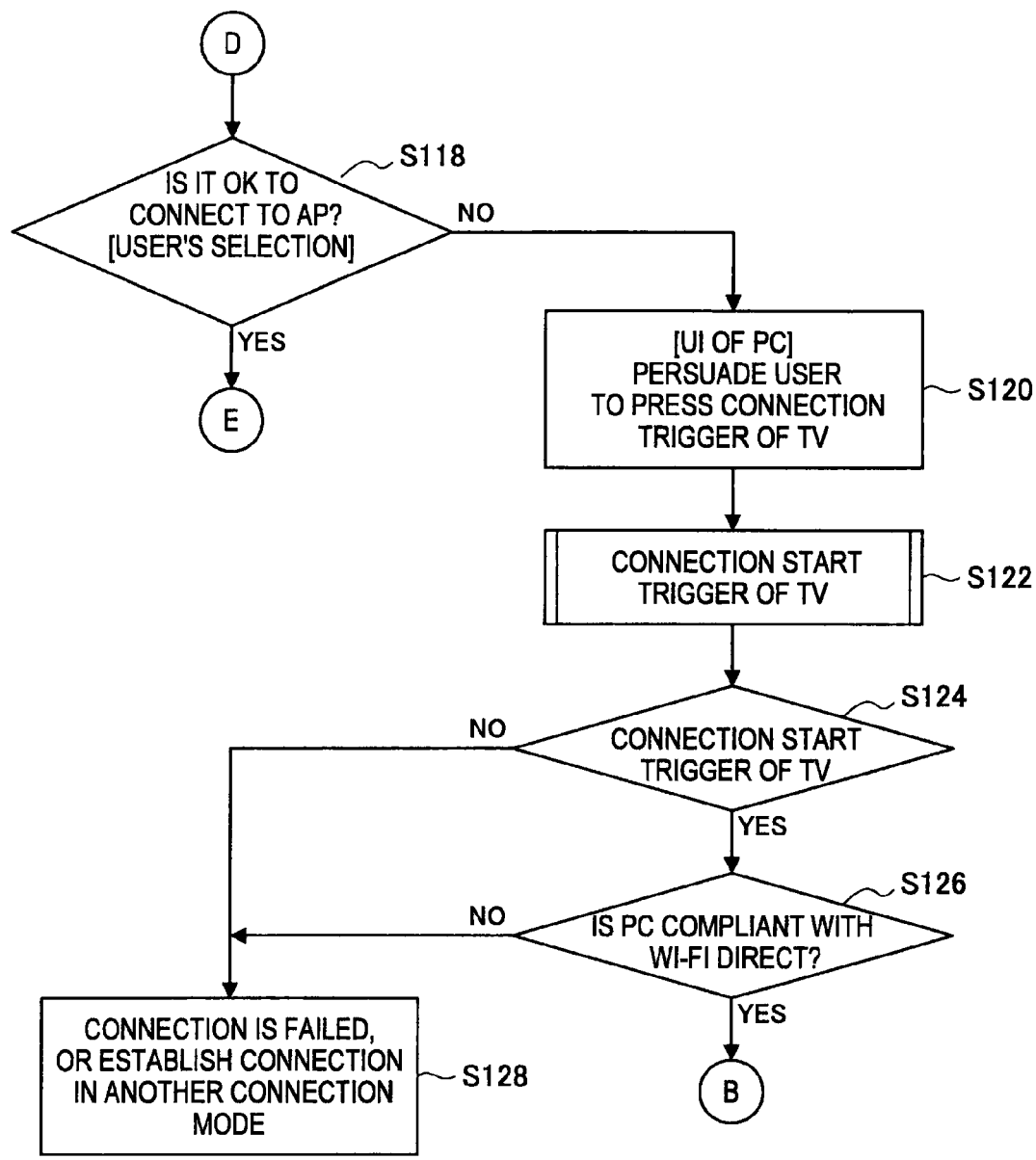

RADIO COMMUNICATION DEVICE, RADIO COMMUNICATION SYSTEM, RADIO COMMUNICATION METHOD, AND PROGRAM

BACKGROUND OF THE INVENTION

Field of the Invention

The present invention relates to a radio communication device, a radio communication system, a radio communication method, and a program.

Description of the Related Art

Recently, a wireless LAN (Local Area Network) system typified by IEEE (Institute of Electrical and Electronics Engineers) 802.11 has become widespread in place of wired networks, because of an advantage that the degree of freedom of the device is high. For example, as described in JP-A-2008-283590, a wireless LAN system defined by IEEE 802.11 includes an access point which operates as a master device, and a group of radio communication devices including multiple stations each operating as a slave device, and multiple stations are connected to one access point.

Here, there can be considered the following two paths in the case of performing communication between the multiple slave devices. One is a path which connects the stations via the access point, and the other is a path which directly connects the stations with each other without routing through the access point. In general, the latter path which directly connects the stations with each other is more advantageous than the former path which connects stations via the access point, from the viewpoints of a transmission rate, transmission delay, and an effective utilization of a radio band.

Further, in the case of using the path which directly connects the slave devices with each other, the following two connection modes are suggested. One is IEEE 802.11z (Tunneled Direct Link Setup; hereinafter, referred to as TDLS) which is defined by IEEE, and the other is Wi-Fi Direct which is defined by Wi-Fi Alliance. TDLS is a mode in which direct communication is performed between the slave devices after the slave devices are connected via the access point. On the other hand, Wi-Fi Direct is a mode in which direct communication between the slave devices can be performed even when the slave devices are not connected to the access point.

Wi-Fi Direct is more advantageous than TDLS from the viewpoint that, even in the case where the connection to the access point is not permitted for network security reasons, Wi-Fi Direct can establish connection between only devices that require communication. However, in Wi-Fi Direct, it is necessary that one of the slave devices operates in the same manner as a master device, and hence, Wi-Fi Direct is inferior to TDLS from the viewpoints of an effective utilization of a radio band and a power consumption of the device serving as a master device.

SUMMARY OF THE INVENTION

For example, in the case of connecting a new radio communication device to the access point which operates as a master device and the group of radio communication devices including multiple stations each operating as a slave device, which are described above, there was an issue that a user had to perform connection setup of the new radio communication device after studying complicated state and technical issues, because an appropriate connection path and an appropriate connection mode differed depending on various states.

In light of the foregoing, it is desirable to provide a novel and improved radio communication device, radio communication system, radio communication method, and program, which are capable of autonomously selecting a connection path and a connection mode depending on a connection state between radio communication devices.

According to an embodiment of the present invention, there is provided a radio communication device which includes a reception unit which receives information indicating a connection state or a communication capability of another radio communication device which the radio communication device attempts to connect to, and a selection unit which selects, depending on the information received by the reception unit, which communication is to be performed from among first communication in which a direct connection to such other radio communication device is established and direct communication with such other radio communication device is performed, second communication in which a connection to such other radio communication device via a base station is established and direct communication with such other radio communication device is performed, and third communication in which a connection to such other radio communication device via the base station is established and indirect communication with such other radio communication device via the base station is performed.

Further, the radio communication device may further include an acquisition unit which acquires information indicating a connection state or a communication capability of the radio communication device. The selection unit may select, depending on the information received by the reception unit and the information acquired by the acquisition unit, which of the first communication, the second communication, and the third communication is to be performed.

Further, the information indicating a communication capability may be information (Capability) of a communication mode which is usable by the radio communication device.

Further, the information indicating a communication capability may be information of a communication mode which is recommended by such other radio communication device.

Further, the radio communication device may further include a determination unit which determines, when such other radio communication device and the base station are already connected to each other and the first communication is selected by the selection unit, depending on the information indicating a connection state of such other radio communication device, whether to perform the first communication by disconnecting a connection with the base station or to perform the first communication without disconnecting the connection to the base station.

Further, the determination unit may determine whether to perform the first communication by using a frequency different from a frequency used in communication between the radio communication device and the base station, depending on the information indicating a connection state of such other radio communication device.

Further, the information indicating a connection state may be information of a connection state in the past between such other radio communication device and the radio communication device.

Further, the information of a connection state in the past may be information of whether or not an encryption key used for connecting to such other radio communication device is already set.

Further, the information indicating a connection state may be information of a current connection state between such other radio communication device and the radio communication device.

Further, the information indicating a connection state may be information of a radio wave intensity transmitted from such other radio communication device and a radio wave intensity transmitted from the base station.

Further, the information indicating a connection state may be information of a measurement result of interference with respect to a frequency being used by such other radio communication device or the radio communication device.

Further, the information indicating a connection state may be request information of an application program being used by such other radio communication device or the radio communication device.

Further, the acquisition unit may acquire connection information by regular broadcast-transmission from any radio communication device.

Further, the reception unit may receive the information which is inserted into Probe Request or Probe Response defined by IEEE 802.11.

Further, the reception unit may receive the information which is inserted into a beacon defined by IEEE 802.11.

Further, the reception unit may receive the information which is inserted into Action Frame or Public Action Frame defined by IEEE 802.11.

Further, the reception unit may receive the information which is inserted into information of a higher-level layer of a layer 3 or above which is performed through Data Frame defined by IEEE 802.11.

According to another embodiment of the present invention, there is provided a radio communication system which includes a first radio communication device and a second radio communication device. The first radio communication device includes a reception unit which receives information indicating a connection state or a communication capability of the second radio communication device, and a selection unit which selects, depending on the information received by the reception unit, which communication is to be performed from among first communication in which a direct connection to the second radio communication device is established and direct communication with the second radio communication device is performed, second communication in which a connection to the second radio communication device via a base station is established and direct communication with the second radio communication device is performed, and third communication in which a connection to the second radio communication device via the base station is established and indirect communication with the second radio communication device via the base station is performed.

According to another embodiment of the present invention, there is provided a program for causing a computer to function as a radio communication device which includes a reception unit which receives information indicating a connection state or a communication capability of another radio communication device which the radio communication device attempts to connect to, and a selection unit which selects, depending on the information received by the reception unit, which communication is to be performed from among first communication in which a direct connection to such other radio communication device is established and direct communication with such other radio communication device is performed, second communication in which a connection to such other radio communication device via a base station is established and direct communication with such other radio communication device is performed, and third communication in which a connection to such other radio communication device via the base station is established and indirect communication with such other radio communication device via the base station is performed.

According to another embodiment of the present invention, there is provided a radio communication method which includes the steps of receiving information indicating a connection state or a communication capability of another radio communication device which the radio communication device attempts to connect to, and selecting, depending on the information received by the reception unit, which communication is to be performed from among first communication in which a direct connection to such other radio communication device is established and direct communication with such other radio communication device is performed, second communication in which a connection to such other radio communication device via a base station is established and direct communication with such other radio communication device is performed, and third communication in which a connection to such other radio communication device via the base station is established and indirect communication with such other radio communication device via the base station is performed.

According to the embodiments of the present invention described above, a connection path and a connection mode can be autonomously selected depending on a connection state between radio communication devices.

BRIEF DESCRIPTION OF THE DRAWINGS

FIG. 7B is a flowchart showing the detail of the connection operation between the PC and the TV according to the embodiment;

FIG. 7C is a flowchart showing the detail of the connection operation between the PC and the TV according to the embodiment;

DETAILED DESCRIPTION OF THE EMBODIMENTS

Figure 1:
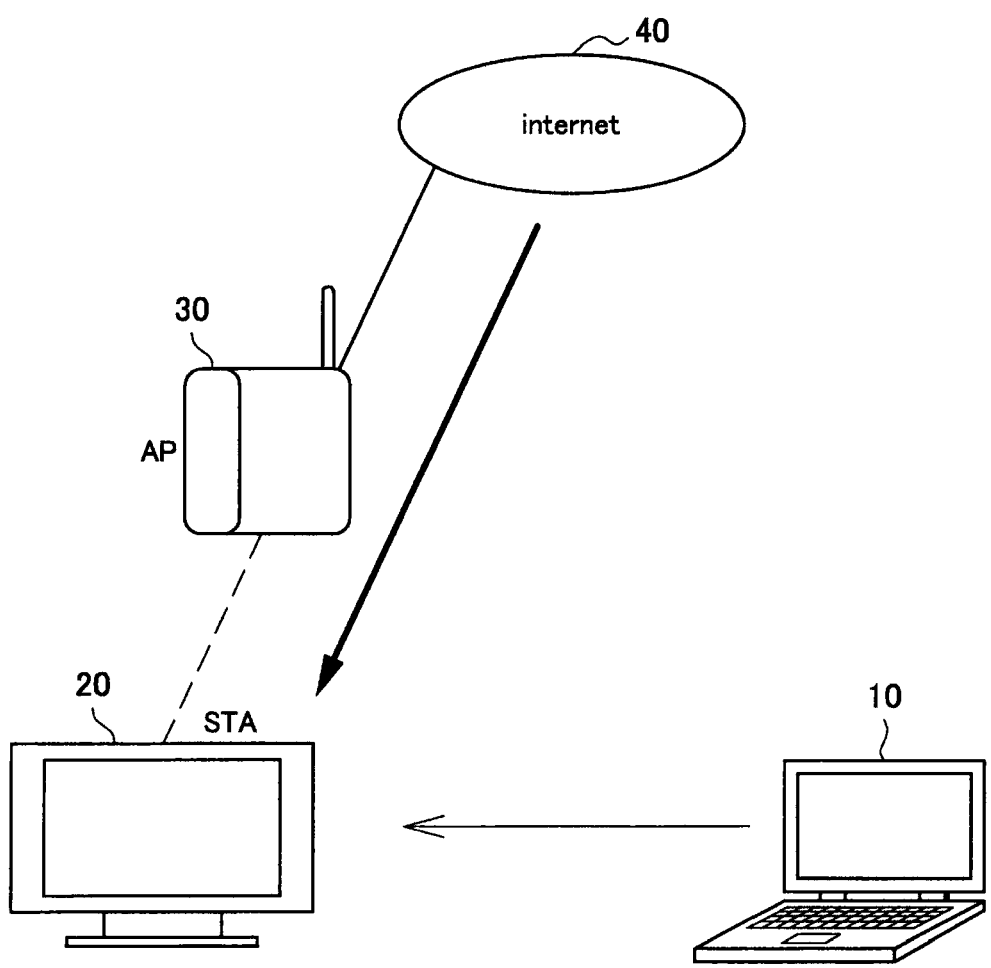
FIG. 1 is an explanatory diagram illustrating a connection configuration of radio communication according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, the "detailed description of the embodiments" will be described in the following order.
[1] Object of present embodiment
[2] Outline of radio communication system
[3] Configuration of radio communication device
[4] Connection operation between radio communication devices
[4-1] First operation example
[4-2] Second operation example
[4-3] Third operation example

[1] OBJECT OF PRESENT EMBODIMENT

Figure 17:
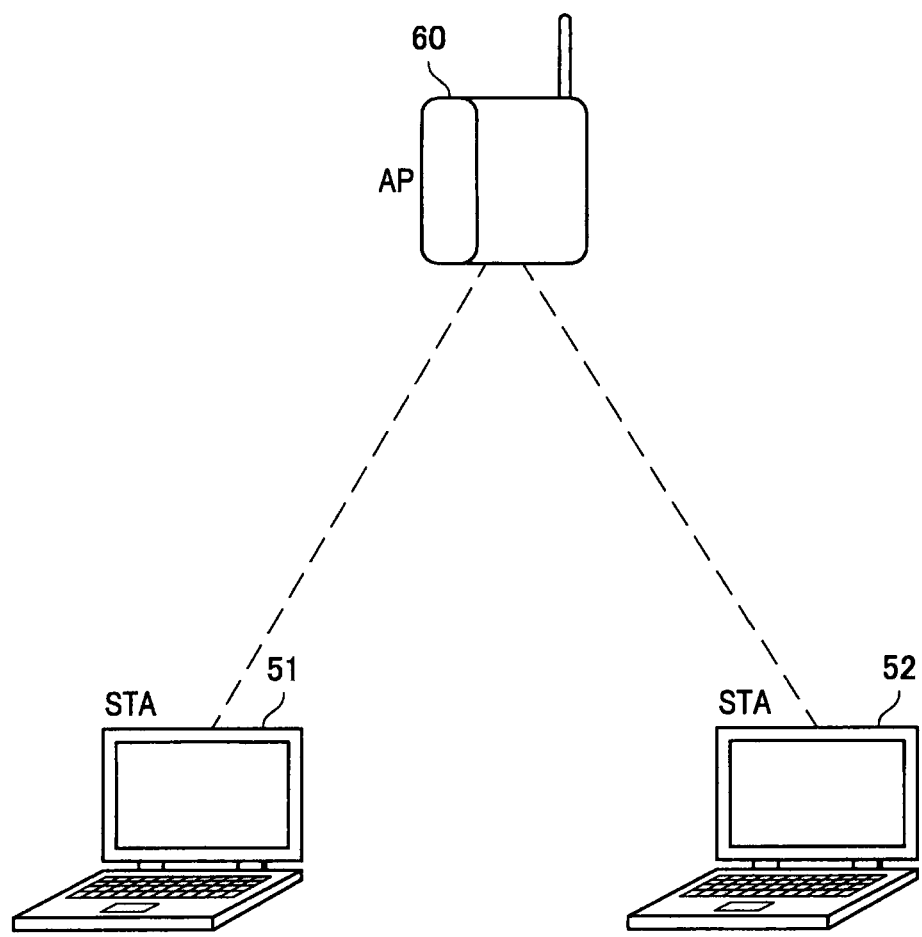
FIG. 17 is an explanatory diagram illustrating a connection configuration of general radio communication.

First, with reference to FIGS. 17 to 20, an object of the present embodiment will be described. FIGS. 17 to 20 are each an explanatory diagram illustrating a connection configuration of general radio communication. Recently, a wireless LAN (Local Area Network) system typified by IEEE (Institute of Electrical and Electronics Engineers) 802.11 has become widespread in place of wired networks, because of an advantage that the degree of freedom of the device is high. For example, as shown in FIG. 17, a wireless LAN system defined by IEEE 802.11 includes an access point (AP) 60, which operates as a master device, and a group of radio communication devices including stations (ST) 51, 52 each operating as a slave device, and multiple stations are connected to one access point 60.

Figure 18:
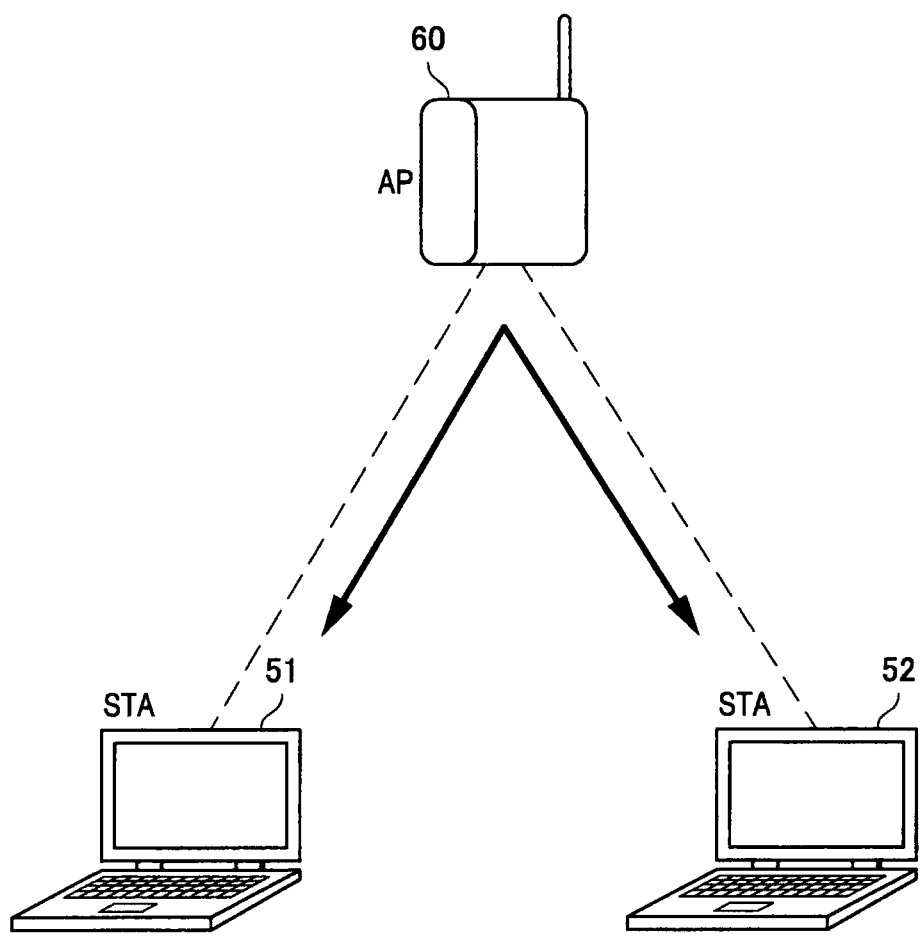
FIG. 18 is an explanatory diagram illustrating a connection configuration of general radio communication.

Here, there can be considered the following two paths in the case of performing communication between the slave device 51 and the slave device 52. One is a path which connects the stations via the access point as shown in FIG. 18, and the other is a path which directly connects the stations with each other without routing through the access point. In general, the latter path which directly connects the stations with each other is more advantageous than the former path which connects stations via the access point, from the viewpoints of a transmission rate, transmission delay, and an effective utilization of a radio band.

Figure 19:
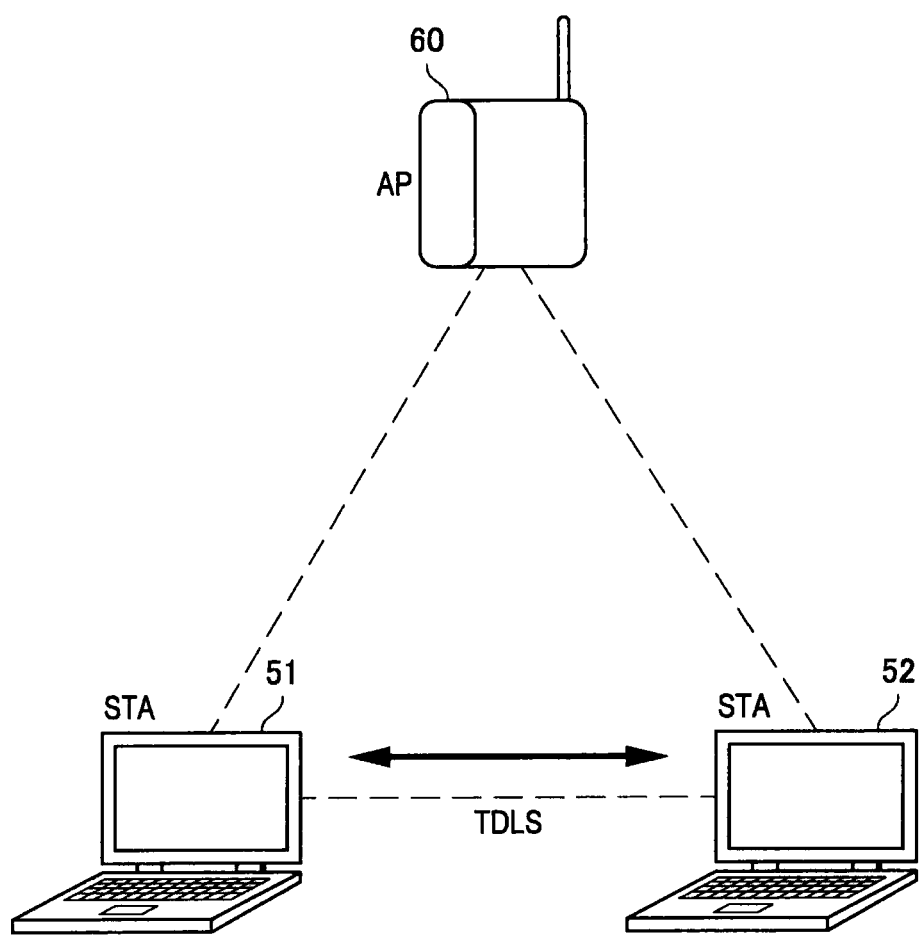
FIG. 19 is an explanatory diagram illustrating a connection configuration of general radio communication.

Further, in the case of using the path which directly connects the slave devices with each other, the following two connection modes are suggested. One is IEEE 802.11z (Tunneled Direct Link Setup; hereinafter, referred to as TDLS) which is defined by IEEE, and the other is Wi-Fi Direct which is defined by Wi-Fi Alliance. As shown in FIG. 19, TDLS is a mode in which direct communication is performed between the slave device 51 and the slave device 52 after the slave device 51 and the slave device 52 are connected via the access point 60. When both slave devices are each in a state capable of being connected to the access point 60, there is usually performed radio communication by TDLS.

Figure 20:
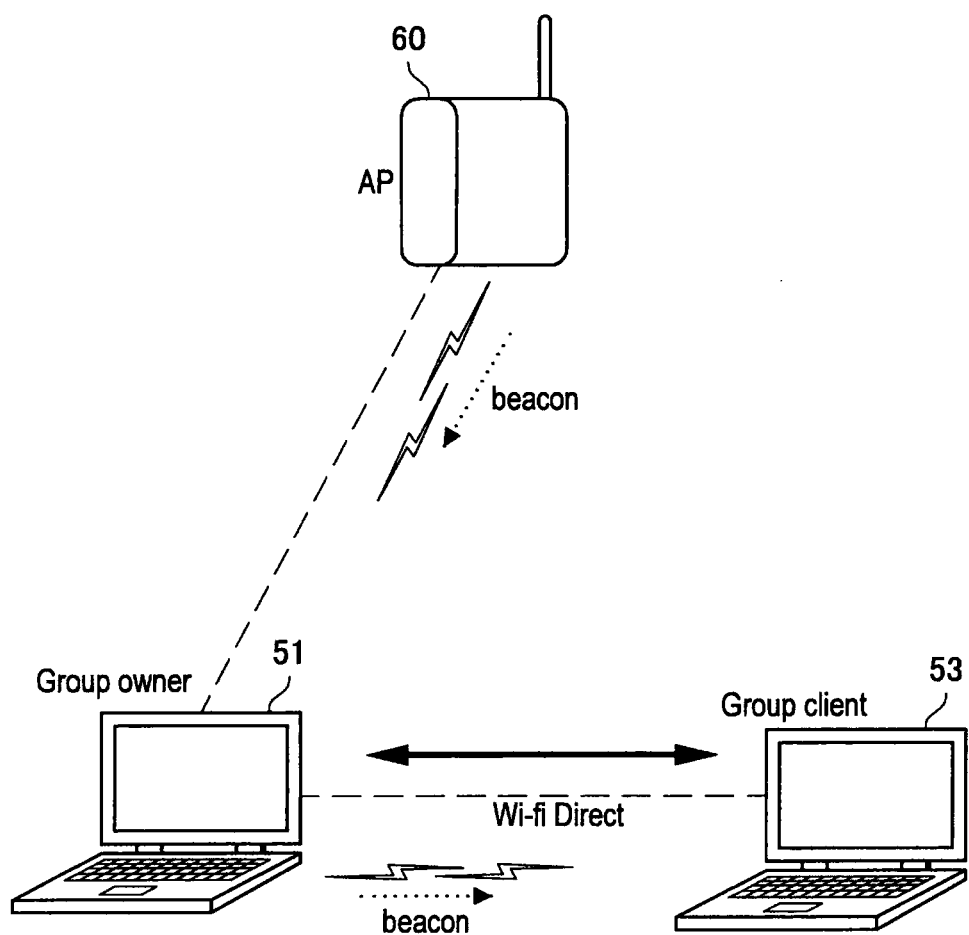
FIG. 20 is an explanatory diagram illustrating a connection configuration of general radio communication.

On the other hand, Wi-Fi Direct is a mode in which direct communication between the slave devices can be performed even when the slave devices are not connected to the access point. As shown in FIG. 20, Wi-Fi Direct does not necessarily have to establish connection to the access point, and can establish connection between only devices that require a connection. For example, Wi-Fi Direct is more advantageous than TDLS from the viewpoint that, even in the case where the connection to the access point is not permitted for network security reasons, Wi-Fi Direct can establish connection between only devices that require communication. However, in Wi-Fi Direct, it is necessary that one of the radio communication devices, which are directly connected with each other, serves as a master device (Group Owner) and performs an operation of transmitting a beacon, for example, in the same manner as an access point. Therefore, Wi-Fi Direct is inferior to TDLS from the viewpoints of an effective utilization of a radio band and a power consumption of the device serving as a master device.

For example, in the case of connecting a new radio communication device to the access point which operates as a master device and the group of radio communication devices including multiple stations each operating as a slave device, which are described above, there was an issue that a user has to perform connection setup of the new radio communication device after studying complicated state and technical issues, because an appropriate connection path and an appropriate connection mode differ depending on various states. In light of the foregoing, a radio communication system according to the present embodiment of the present invention is produced. According to the radio communication system of the present embodiment, a connection path and a connection mode can be autonomously selected depending on a connection state between radio communication devices.

[2] OUTLINE OF RADIO COMMUNICATION SYSTEM

In the above, an object of the present embodiment has been described. Next, with reference to FIGS. 1 to 5, an outline of a radio communication system of the present embodiment will be described. FIGS. 1 to 5 are each an explanatory diagram illustrating a connection configuration of radio communication according to the present embodiment. In the present embodiment, as shown in FIG. 1, an access point (AP) which operates as a master device (base station) and a radio communication device serving as a station (ST) which operates as a slave device are connected to each other and form one radio communication device group. Then, a radio communication device which does not belong to the radio communication device group attempts to connect to the radio communication device included in the radio communication device group.

Specifically, an example of the radio communication device connected to an access point 30 (hereinafter, referred to as AP 30) includes a television receiver (hereinafter, referred to as TV 20). The TV 20 acquires video from the Internet via the AP 30. As the radio communication device which is not connected to the AP 30, there can be exemplified a PC (Personal Computer) (hereinafter, referred to as PC 10). The PC 10 is connected to the TV 20, and tries to cause the video or the like received by the TV 20 to be displayed on a display screen of the PC 10. In this case, the connection path and the connection mode of the radio communication between the PC 10 and the TV 20 depend on the connection state between the devices.

Figure 2:
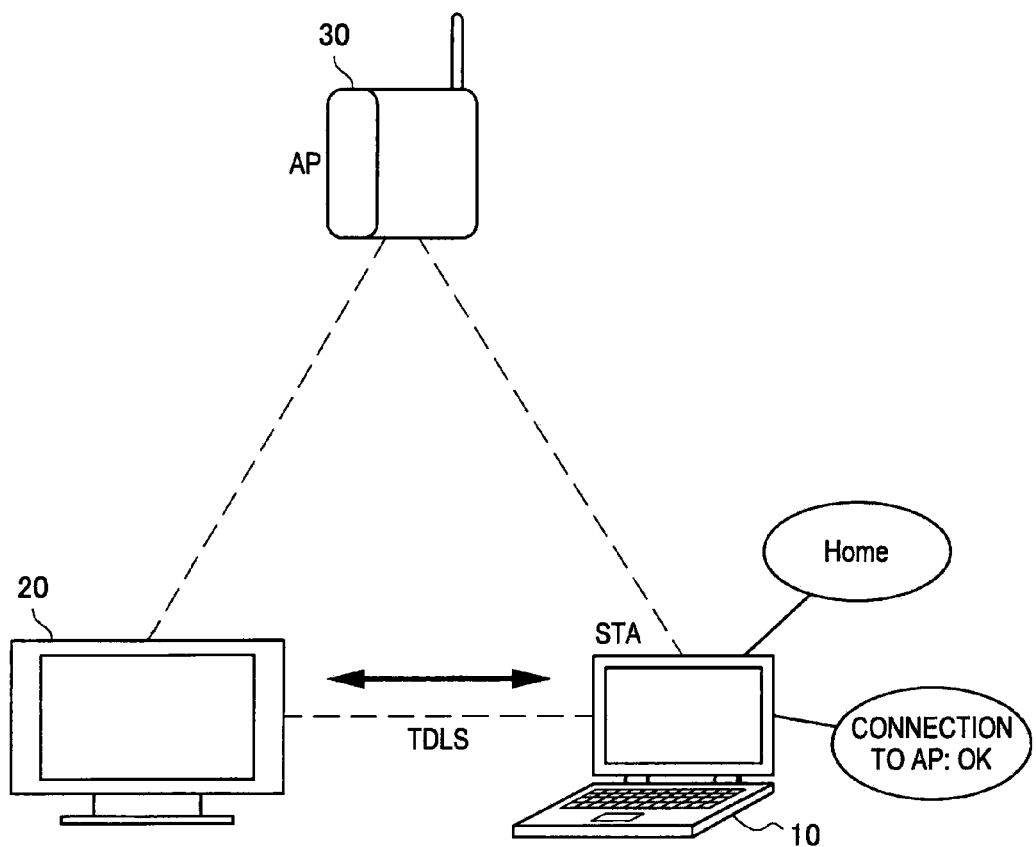
FIG. 2 is an explanatory diagram illustrating a connection configuration of the radio communication according to the embodiment.

For example, in FIG. 2, the AP 30 and the TV 20 are connected to each other inside a home, and a PC 10, which is a home device, is already connected to the AP 30. In this case, radio communication by TDLS is generally performed as described above.

Figure 3:
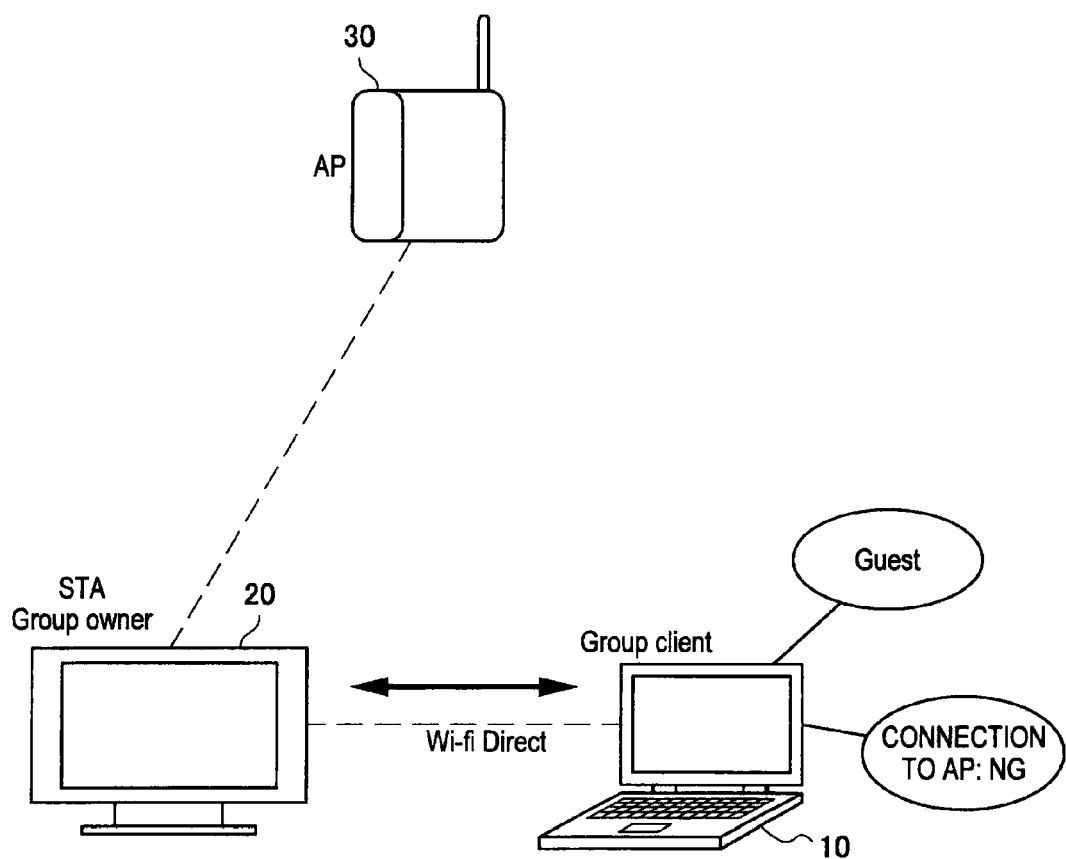
FIG. 3 is an explanatory diagram illustrating a connection configuration of the radio communication according to the embodiment.

Further, as shown in FIG. 3, there can be considered a case where a PC 10, which is a device of a friend or the like, attempts to connect to the TV 20 and does not want to connect to the AP 30 for security reasons. In this case, radio communication by Wi-Fi Direct is suitable, which does not require the connection to the AP 30.

Figure 4:
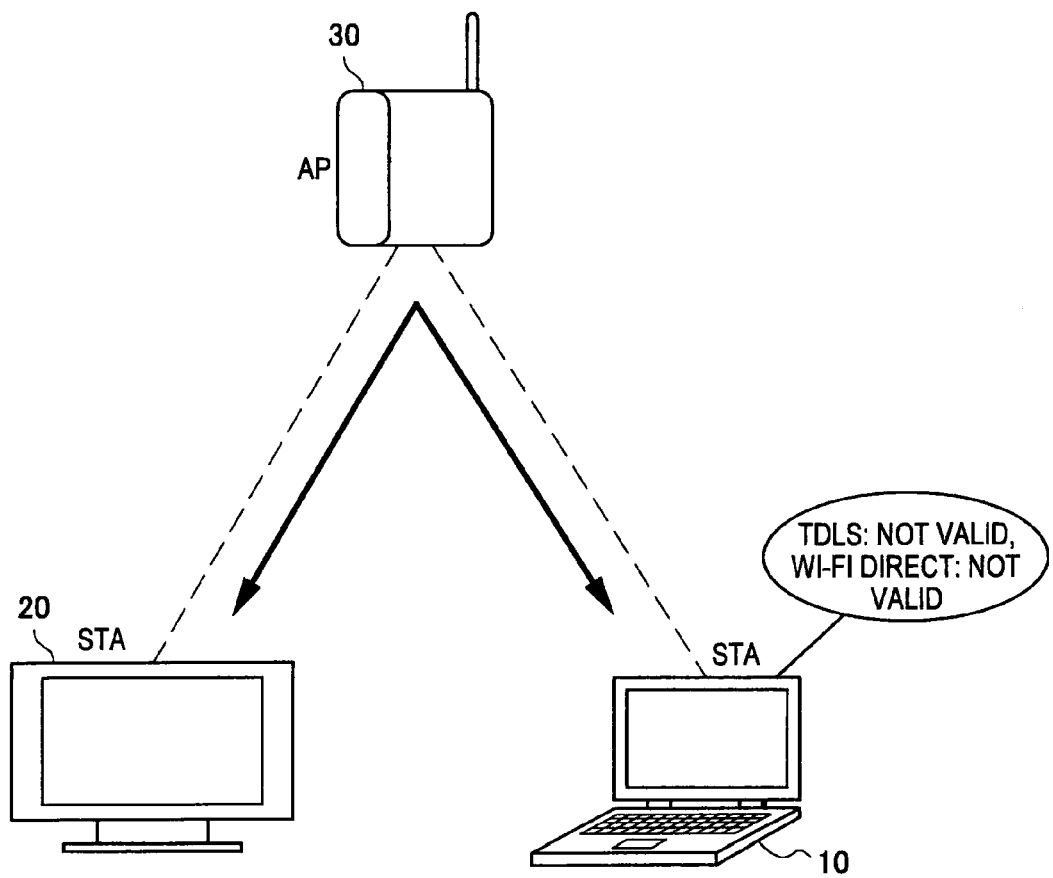
FIG. 4 is an explanatory diagram illustrating a connection configuration of the radio communication according to the embodiment.

Further, as shown in FIG. 4, in the case where neither the PC 10 nor the TV 20 has a radio communication function by TDLS or Wi-Fi Direct, or in the case where a radio wave environment between the radio communication devices is poor, it is necessary to perform radio communication via the AP 30.

Figure 5:
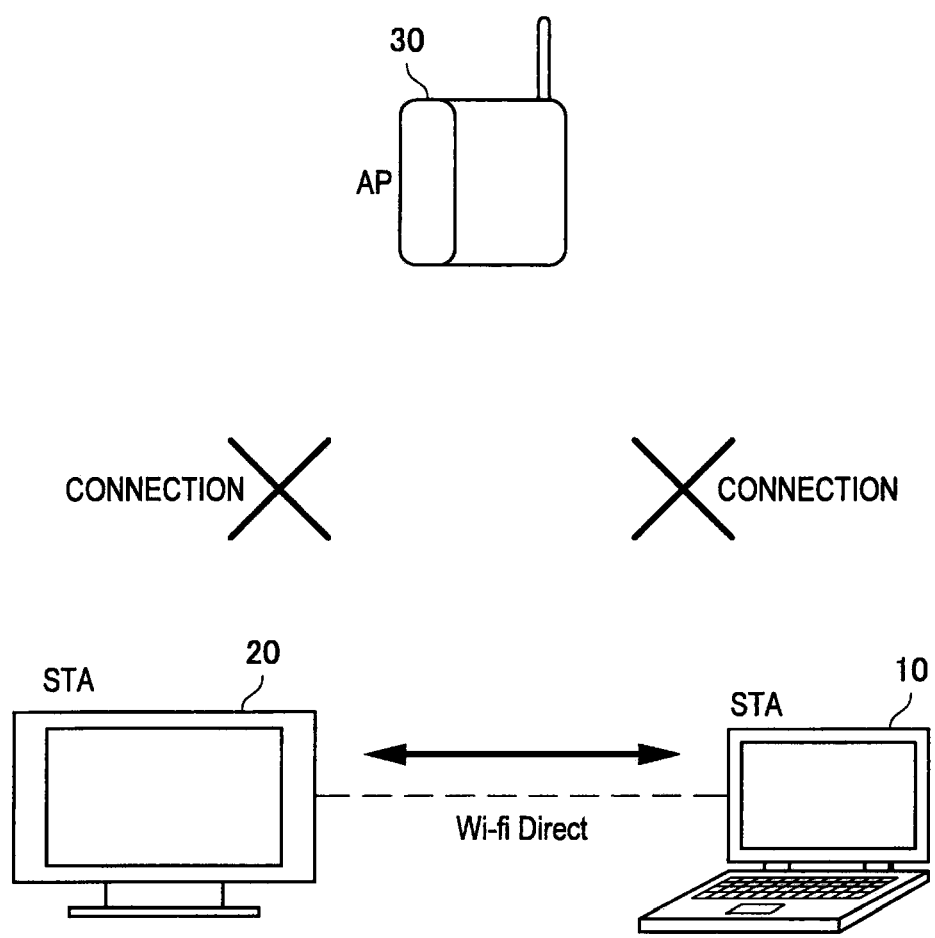
FIG. 5 is an explanatory diagram illustrating a connection configuration of the radio communication according to the embodiment.

Further, as shown in FIG. 5, there is also a case where it is more appropriate to disconnect the connection between the TV 20 and the AP 30 and to directly connect the TV 20 newly to the PC 10 by Wi-Fi Direct depending on an application, a user's selection, and another connection state.

Further, as shown in FIG. 2, in the case of connecting the user's PC 10 to the AP 30 at home, radio communication by Wi-Fi Direct is suitable, because a key setup procedure is also necessary when an encryption key is not yet set (when the connection is established for the first time). On the other hand, when the encryption key is already set, the user's PC can be automatically connected to the AP 30 at home, and hence, radio communication by TDLS is suitable. Further, in the case where the TV 20 and the AP 30 are not connected to each other or in the case where the AP 30 is not present, it is necessary that the TV 20 and the PC 10 perform radio communication by Wi-Fi Direct. In the case where the TV 20 and the AP 30 are not connected to each other or when the AP 30 is not present, and in the case where it is difficult to perform the radio communication by Wi-Fi Direct, direct communication in another mode is performed, or the connection is failed.

In this way, in the case of newly connecting the PC 10 to the radio communication device group (TV 20 and AP 30), an appropriate connection configuration, communication mode, connection procedure, and the like differ depending on a connection state and a communication capability of the radio communication device. Therefore, in the radio communication system according to the present embodiment, information indicating the connection state and the communication capability of the radio communication device described above is transmitted and received between the radio communication devices, to thereby autonomously determine the connection configuration, the communication mode, and the like.

[3] CONFIGURATION OF RADIO COMMUNICATION DEVICE

Figure 6:
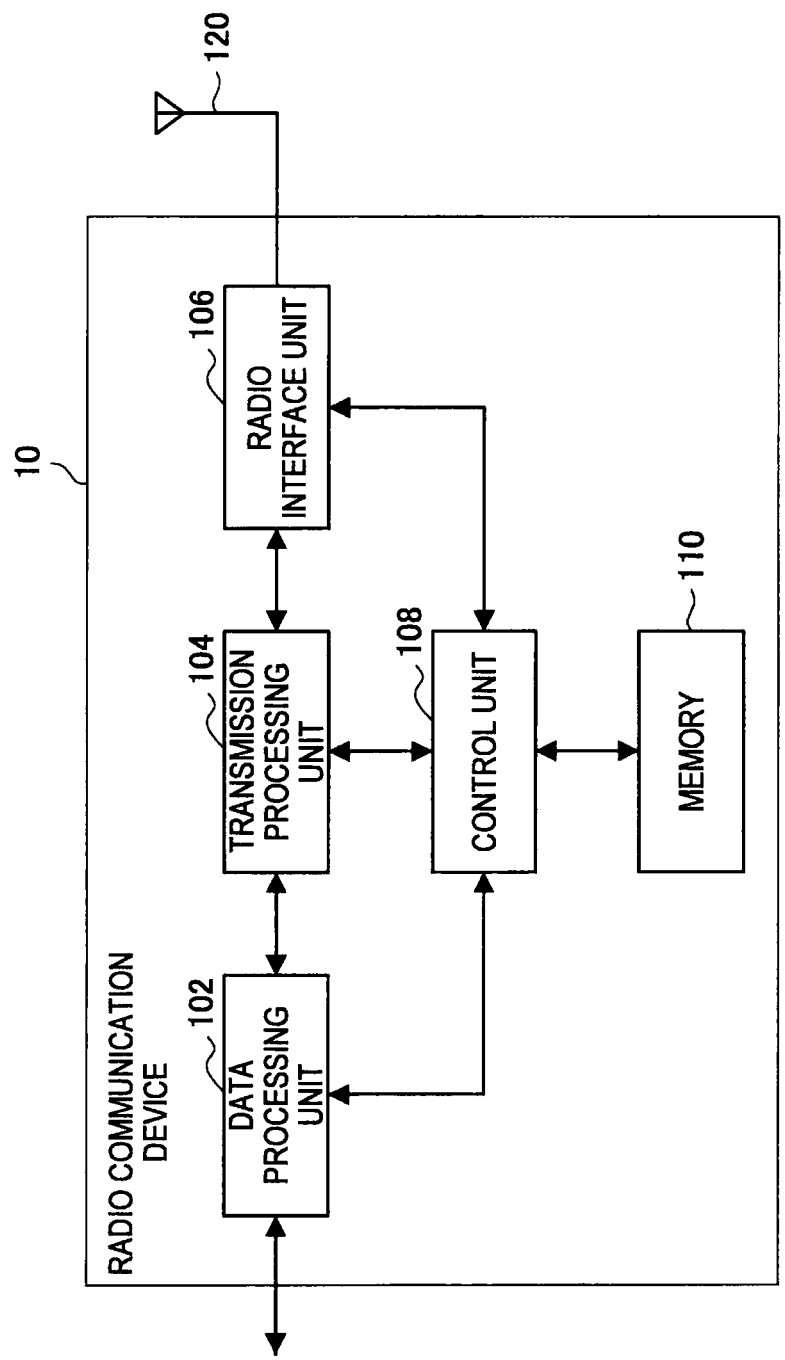
FIG. 6 is a functional block diagram showing a configuration of a PC according to the embodiment.

In the above, the outline of the radio communication system has been described. Next, with reference to FIG. 6, a configuration of the PC 10 will be described. FIG. 6 is a functional block diagram showing a configuration of the PC 10 as an example of the radio communication device according to the present embodiment. Note that, since the TV 20 can be configured substantially the same as the PC 10, a detailed description of the configuration of the TV 20 will be omitted.

As shown in FIG. 6, the PC 10 includes a data processing unit 102, a transmission processing unit 104, a radio interface unit 106, a control unit 108, a memory 110, and an antenna 120.

At the time of transmission, the data processing unit 102 creates various data frames and various data packets in response to a request from, for example, a higher-level layer to supply the data frames and the data packets to the transmission processing unit 104. The transmission processing unit 104 at the time of transmission performs processing of addition of error detection codes such as various data headers or FCSs (Frame Check Sequences) to the packets created by the data processing unit 102, and provides the processed data to the radio interface unit 106. The radio interface unit 106 creates a modulation signal in a frequency band of a carrier wave from the data received from the transmission processing unit 104 and causes the antenna 120 to transmit the modulation signal as a radio signal.

Further, in a receiving operation, the radio interface unit 106 down-converts the radio signal received by the antenna 120 and converts the radio signal into a bit string to decode various data frames. The transmission processing unit 104 analyzes a header added to the data frame supplied from the radio interface unit 106. When the transmission processing unit 104 confirms that the data frame has no error based on the error detection code, the transmission processing unit 104 supplies the data frame to the data processing unit 102. The data processing unit 102 processes and analyzes the data frame and the data packet supplied from the transmission processing unit 104.

Thus, the data processing unit 102, the transmission processing unit 104, the radio interface unit 106, and the antenna 120 each function as a communication unit (reception unit and transmission unit). In the case of functioning as a reception unit, there is received information indicating the connection state or the communication capability of the TV 20 connected to a base station which relays radio communication. Further, in the case of functioning as a transmission unit, information indicating the connection state or the communication capability of the PC 10 is transmitted to the radio communication device connected to a base station which relays radio communication.

The control unit 108 controls reception operation and transmission operation of each of the data processing unit 102, the transmission processing unit 104, and the radio interface unit 106. For example, the control unit 108 has a function of performing selection processing for selecting, depending on the connection state or the communication capability of the TV 20 which is received by the reception unit, the communication to be performed from the following: Wi-Fi Direct (first communication) which allows direct connection and direct communication with the TV 20; TDLS (second communication) which allows connection to the TV 20 via the AP 30 and direct communication with the TV 20; and communication via an access point (third communication) which allows connection to the TV 20 via the AP 30 and indirect communication with the TV 20 via the AP 30.

Further, the control unit 108 also has: a function of performing acquisition processing for acquiring information indicating the connection state or the communication capability of the PC 10; a function of, in the case where the TV 20 and the AP 30 are already connected to each other and Wi-Fi Direct is selected, performing determination processing for determining, depending on the information indicating the connection state of the TV 20, whether to perform Wi-Fi Direct by disconnecting the connection to the AP 30 or to perform Wi-Fi Direct without disconnecting the connection to the AP 30; and the like. That is, the control unit 108 functions as a selection unit, an acquisition unit, and a determination unit in cooperation with another configuration.

The memory 110 has a role as a work area for data processing by the control unit 108, and has a function as a storage medium for retaining various kinds of data. The memory 110 may be a storage medium such as a non-volatile memory, a magnetic disk, an optical disk, and an MO (Magneto Optical) disk. Examples of the non-volatile memory include an EEPROM (Electrically Erasable Programmable Read-Only Memory), and an EPROM (Erasable Programmable ROM). Further, examples of the magnetic disk include a hard disk and a disc-like magnetic disk. Further, examples of the optical disk include a CD (Compact Disc, DVD-R (Digital Versatile Disc Recordable)) and a BD (Blu-Ray Disc (registered trademark)).

[4] CONNECTION OPERATION BETWEEN RADIO COMMUNICATION DEVICES

In the above, the configuration of the PC 10 has been described. Next, there will be described first to third operation examples according to the present embodiment for connecting the PC 10 to the TV 20 which is connected to the AP 30.

[4-1] FIRST OPERATION EXAMPLE

Figure 7A:
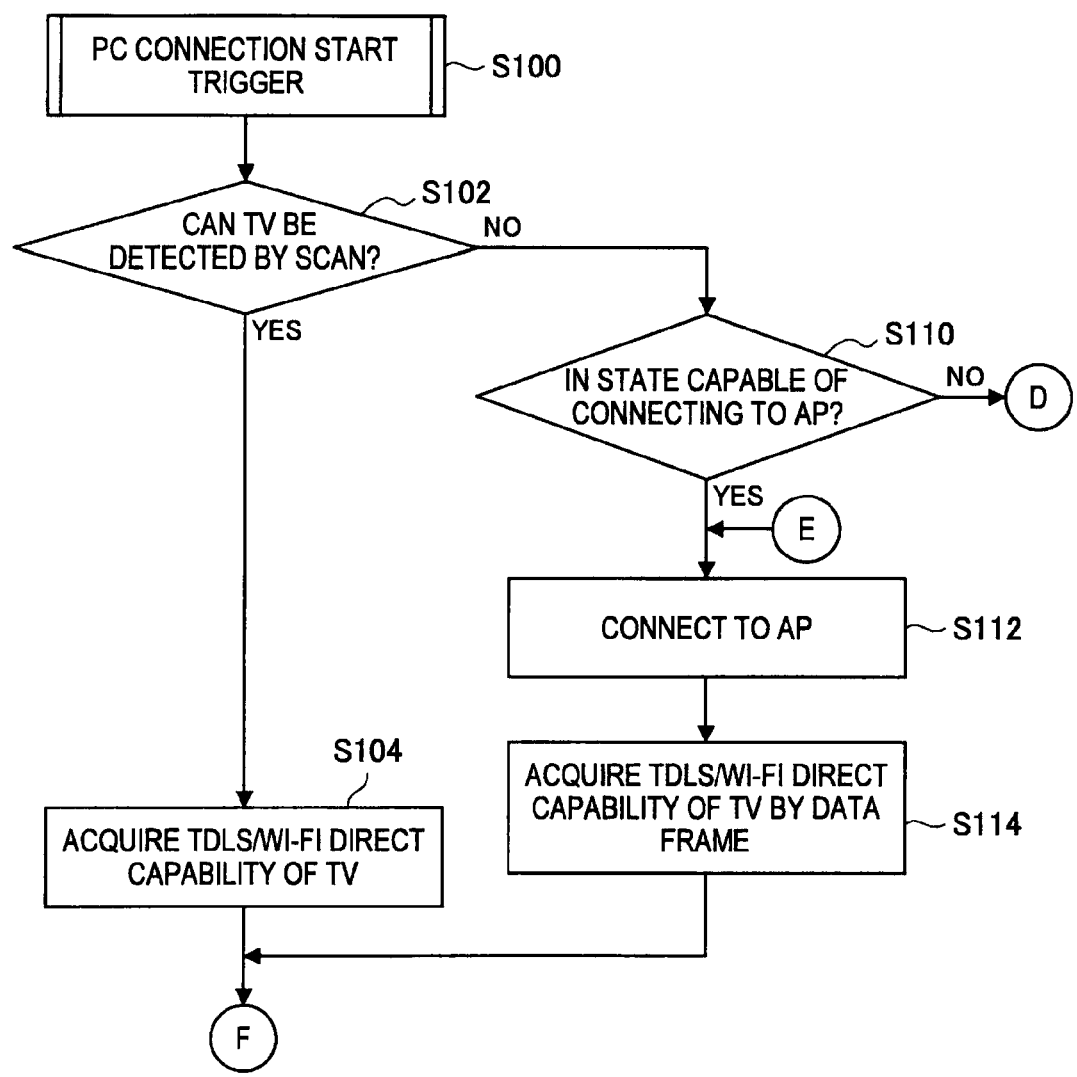
FIG. 7A is a flowchart showing a detail of connection operation between a PC and a TV according to the embodiment.

FIGS. 7A, 7B, and 7C are each a flowchart showing a detail of connection operation for connecting the PC 10 to the TV 20. As shown in FIG. 7A, first, connection processing of the PC 10 is activated (S100) in accordance with input operation by a user. As the input operation by the user in Step S100, there can be exemplified: selecting a connection start item displayed on the display screen of the PC 10; and activating an application for starting the connection.

Next, it is determined by Scan whether or not the TV 20 can be detected (S102). In Step S102, for example, in the case where the TV 20 is a group owner of Wi-Fi Direct, the PC 10 can detect the TV 20 by Active Scan or Passive Scan. When detecting the TV 20 by Active Scan, the PC 10 transmits Probe Request to the TV 20 and attempts to receive Probe Response from the TV 20. Further, when detecting the TV 20 by Passive Scan, the PC 10 attempts to receive a beacon transmitted from the TV 20. Further, even in the case where the TV 20 is not a group owner, when the PC 10 is capable of receiving a response-request packet broadcasted from the TV 20, the PC 10 can detect the TV 20 by Scan.

Figure 8:
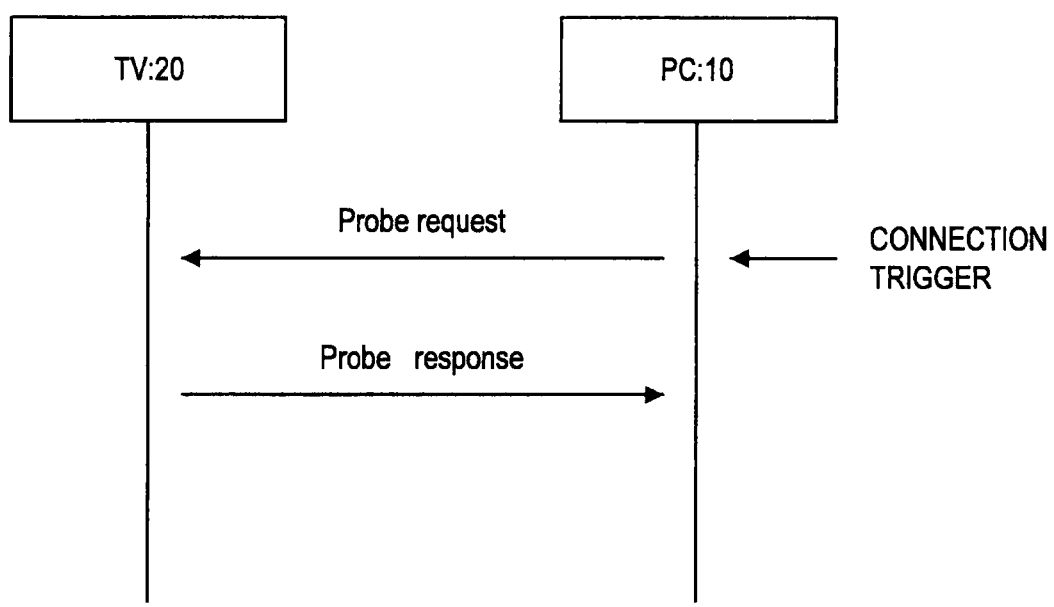
FIG. 8 is an explanatory diagram illustrating the connection operation between the PC and the TV according to the embodiment.

In Step S102, in the case where it is determined by Scan that the TV 20 can be detected, the PC 10 acquires communication capability information (Capability) of the TV 20 (S104). In Step S102, in the case where Probe Request and Probe Response are transmitted and received by Active Scan, the PC 10 acquires communication capability information inserted into Probe Response which is transmitted from the TV 20. For example, as shown in FIG. 8, along with a connection trigger, Probe Request into which information indicating the connection state or the communication capability of the PC 10 is inserted is transmitted from the PC 10. Then, the TV 20, which Probe Request is transmitted to from the PC 10, transmits Probe Response into which information indicating the connection state or the communication capability of the TV 20 is inserted.

Figure 9:
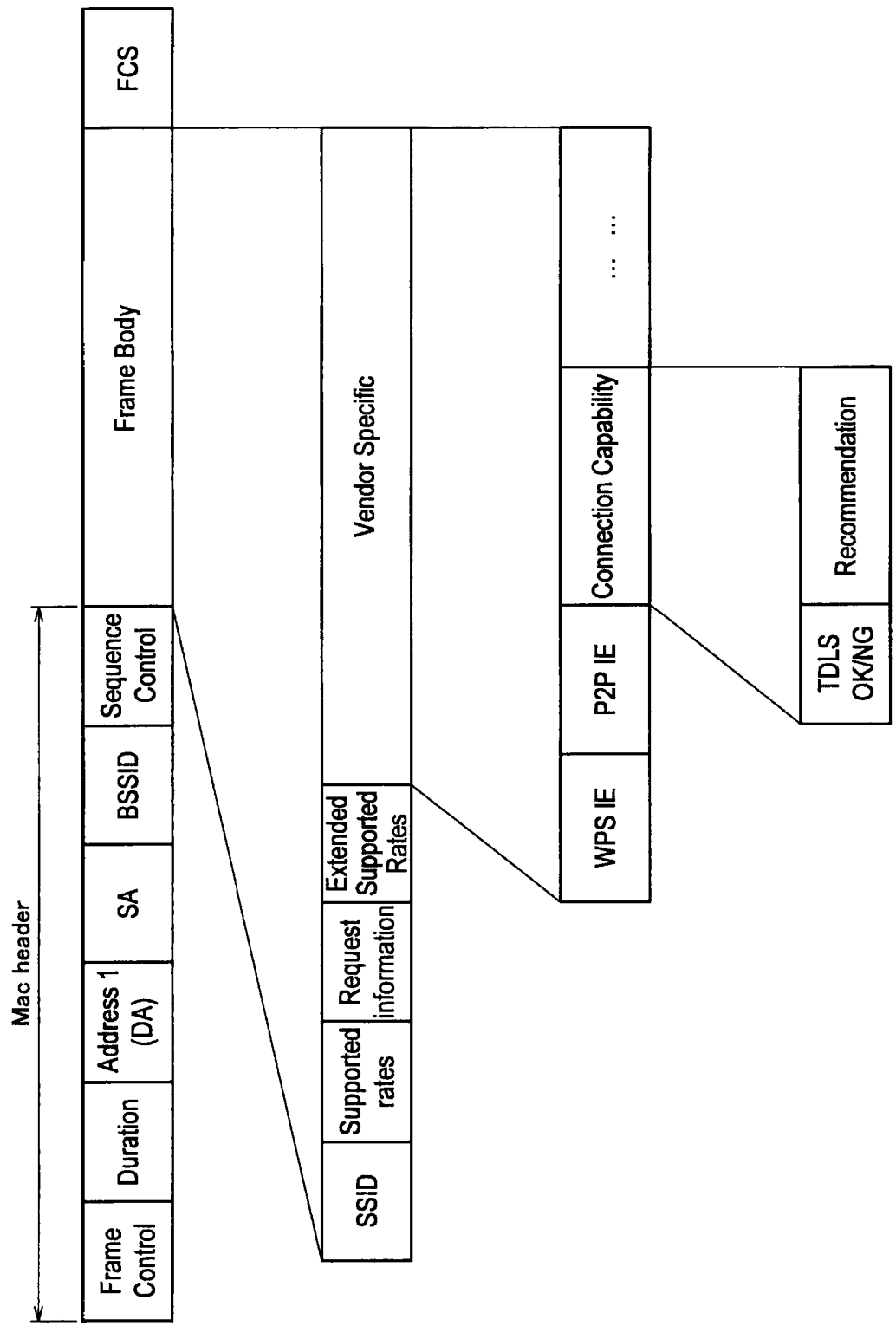
FIG. 9 is an explanatory diagram illustrating an example of Probe Request according to the embodiment.

Here, with reference to FIG. 9 and FIG. 10, Probe Request and Probe Response which are transmitted and received in Step S104 will be described. FIG. 9 is an explanatory diagram illustrating an example of Probe Request. As shown in FIG. 9, Probe Request mainly includes Mac Header for identifying each packet and Frame Body for indicating a content of the packet. Into P2P IE included in Frame Body, there is inserted information indicating whether or not an n-connection is possible in Wi-Fi Direct. Further, into Connection Capability, there are inserted information (TDLS OK/NG) indicating whether or not a connection by TDLS is possible and information (Recommendation) indicating a recommended connection mode.

Figure 10:
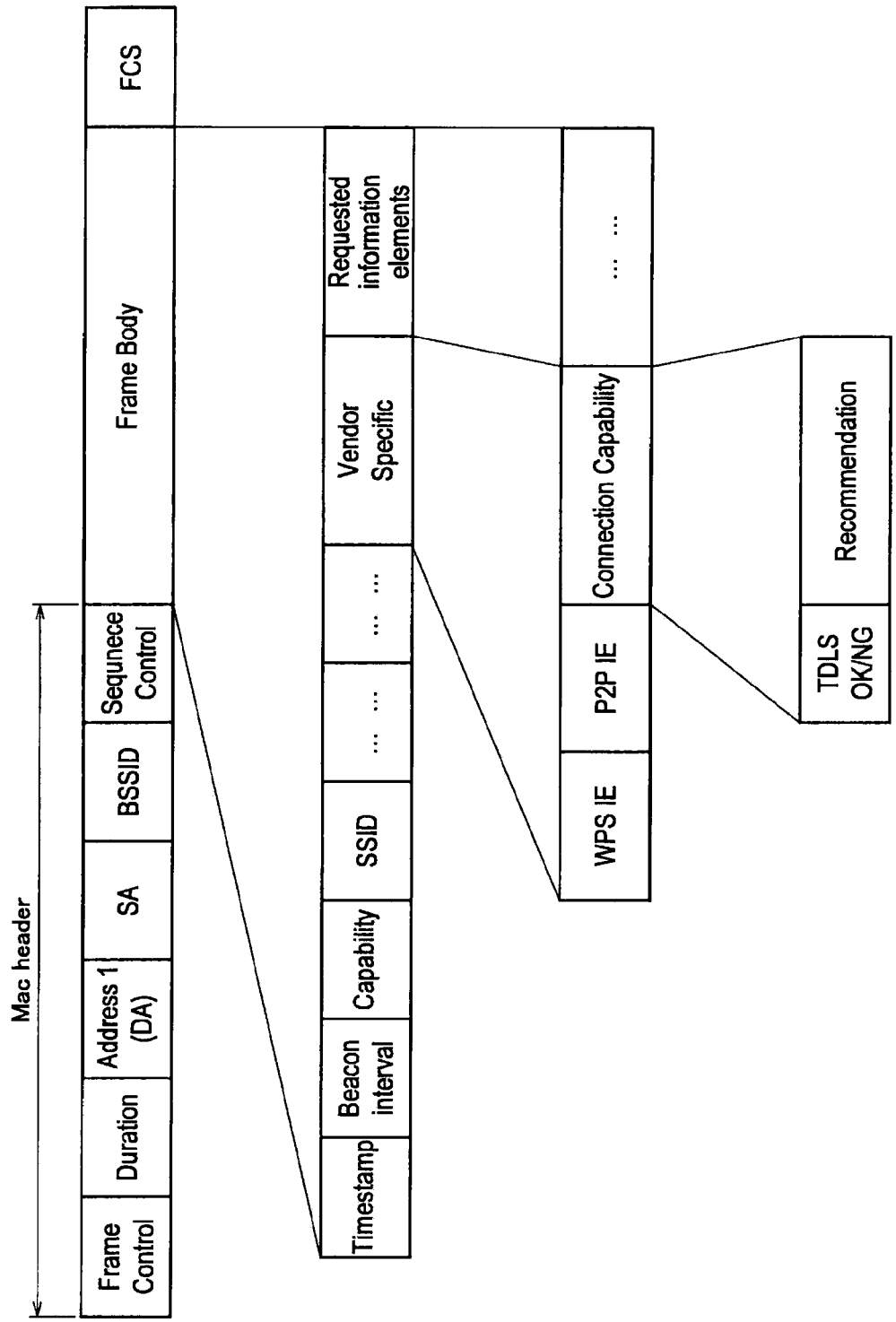
FIG. 10 is an explanatory diagram illustrating an example of Probe Response according to the embodiment.

Further, in Probe Response shown in FIG. 10, information indicating whether or not a connection is possible in Wi-Fi Direct is inserted into P2P IE included in Frame Body, in the same manner as in Probe Request. Further, into Connection Capability, there are inserted information (TDLS OK/NG) indicating whether or not a connection by TDLS is possible and information (Recommendation) indicating a recommended connection mode.

The information indicating a recommended connection mode refers to information indicating which of the connection modes of TDLS and Wi-Fi Direct is recommended. The recommendation of the connection mode may be performed by designating priority depending on applications of the PC 10 and the TV 20. For example, in the case of an application for displaying a moving image reproduced by the PC 10 on the TV 20, which requires more radio band, TDLS which is presumed to have good radio utilization efficiency may be recommended.

In the case of transmitting and receiving Probe Request and Probe Response shown in FIG. 9 and FIG. 10, a preliminarily set frequency channel (Social Channel) may be used, and Probe Response may be transmitted in a round robin manner in the frequencies available for the PC 10.

Figure 11:
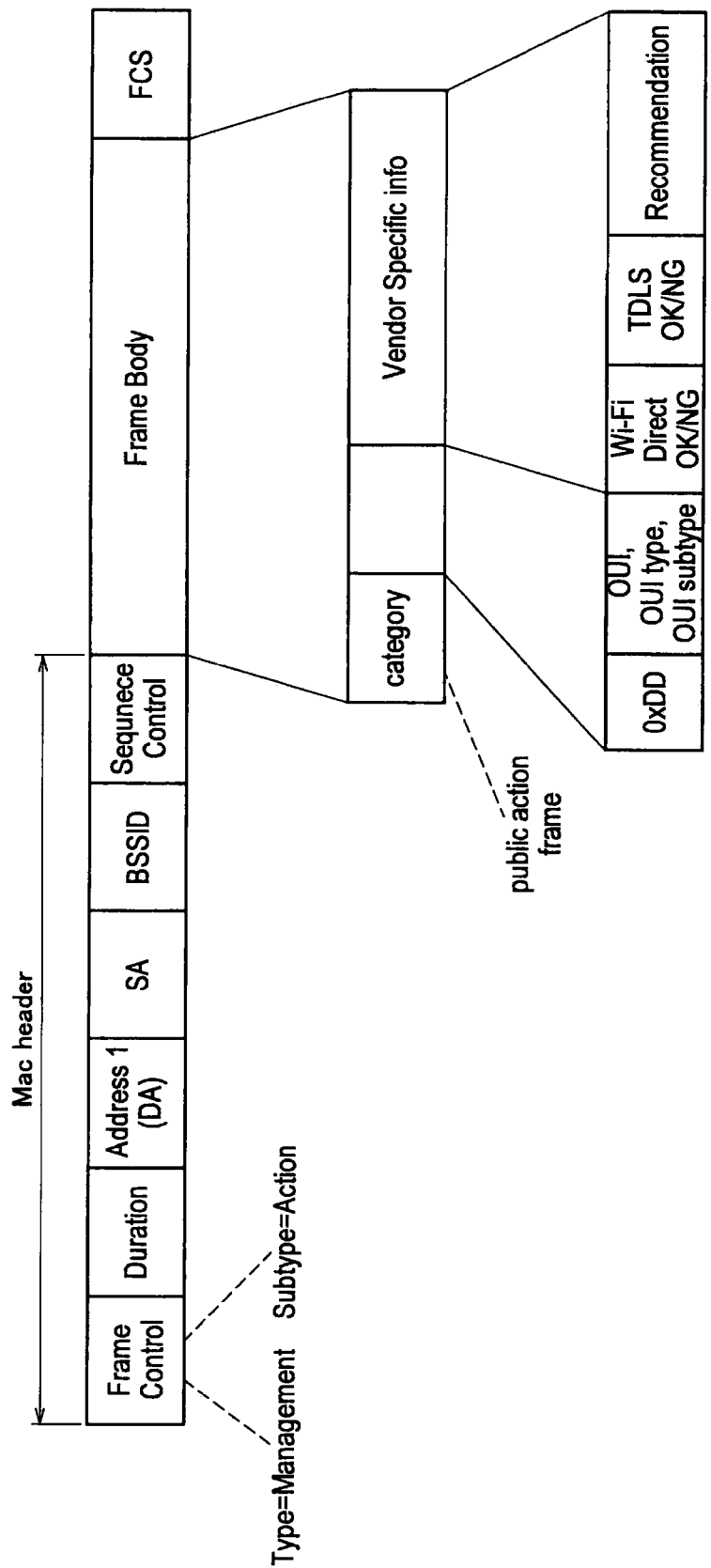
FIG. 11 is an explanatory diagram illustrating an example of Public Action Frame according to the embodiment.

Further, there may be acquired communication capability information which is inserted into Public Action Frame defined by IEEE 802.11. FIG. 11 is an explanatory diagram illustrating an example of Public Action Frame. By using Public Action Frame, it becomes possible for the PC 10 and the TV 20 to notify each other of necessary information under the state where the PC 10 is not connected to the TV 20 nor to the AP 30.

As shown in FIG. 11, into the category included in Frame Body, information indicating the packet is Public Action Frame is inserted. Then, 0xDD indicates that the frame is a unique frame defined by a vendor. Further, by OUI (Organizationally Unique Identifier), OUI type, and OUI subtype, there is indicated the type of the information and which vendor defined the information. Then, into Vender Specific info, there are inserted information (Wi-Fi Direct OK/NG)

indicating whether or not a connection by Wi-Fi Direct is possible, information (TDLS OK/NG) indicating whether or not a connection by TDLS is possible, and information (Recommendation) indicating a recommended connection mode.

As described above, in Step S104, although the communication capability information and the like are transmitted and received by using Probe Request and the like between the PC 10 and the TV 20, examples are not limited thereto, and information which regularly broadcast-transmitted from the TV 20 or the AP 30 may be also received. For example, communication capability information inserted into Information Element of a beacon transmitted from the TV 20 or the AP 30 may be acquired.

Returning to FIG. 7A, in Step S102, in the case where it is determined by Scan that the TV 20 cannot be detected, it is determined whether or not the PC 10 is in a state capable of connecting to the AP 30 (S110). In Step S110, not only whether or not the PC 10 is in a state capable of immediately connecting to the AP 30, but also whether or not the PC 10 is already in a state of being connected may be determined. The state capable of immediately connecting to the AP 30 refers to a state where an encryption key for connecting to the AP 30 is already set. In Step S110, in the case where it is determined that the PC 10 is in a state capable of immediately connecting to the AP 30, the PC 10 connects to the AP 30 (S112).

In Step S112, the TV 20 connected to the AP 30 can be detected. For example, by using UPnP (Universal Plug and Play), a TV 20 which is a device capable of outputting an image is detected. Then, for the TV 20 detected in Step S112, the PC 10 acquires a communication capability of the TV 20 by Data Frame and Action Frame (S114).

Figure 12:
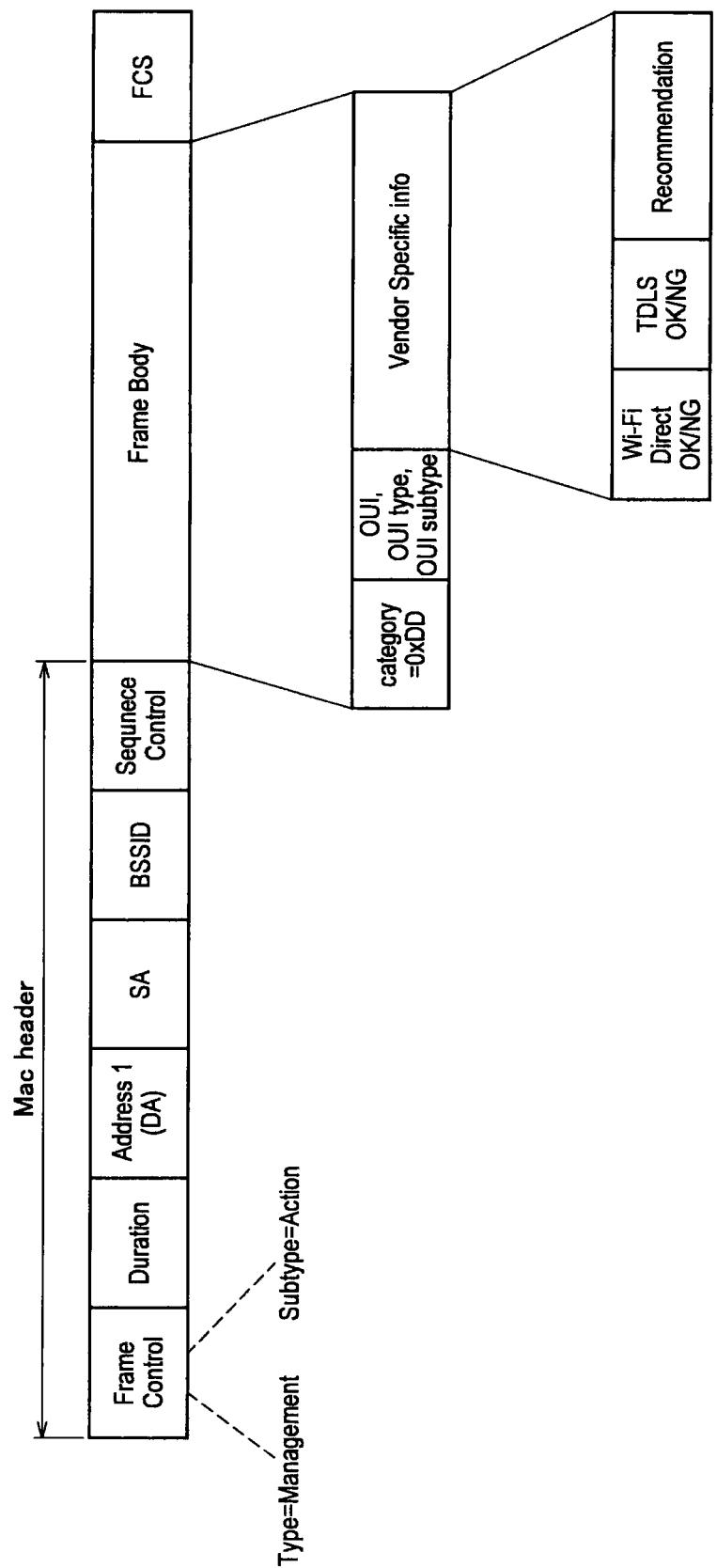
FIG. 12 is an explanatory diagram illustrating an example of Action Frame according to the embodiment.

Here, with reference to FIG. 12 and FIG. 13, Action Frame and Data Frame will be described. FIG. 12 is an explanatory diagram illustrating an example of Action Frame. As shown in FIG. 12, 0xDD included in Frame Body of Action Frame indicates that Action Frame is a unique frame defined by a vendor. Further, by OUI (Organizationally Unique Identifier), OUI type, and OUI subtype, there is indicated the type of the information and which vendor defined the information. Then, into Vender Specific info, there are inserted information (Wi-Fi Direct OK/NG) indicating whether or not a connection by Wi-Fi Direct is possible, information (TDLS OK/NG) indicating whether or not a connection by TDLS is possible, and information (Recommendation) indicating a recommended connection mode.

Figure 13:
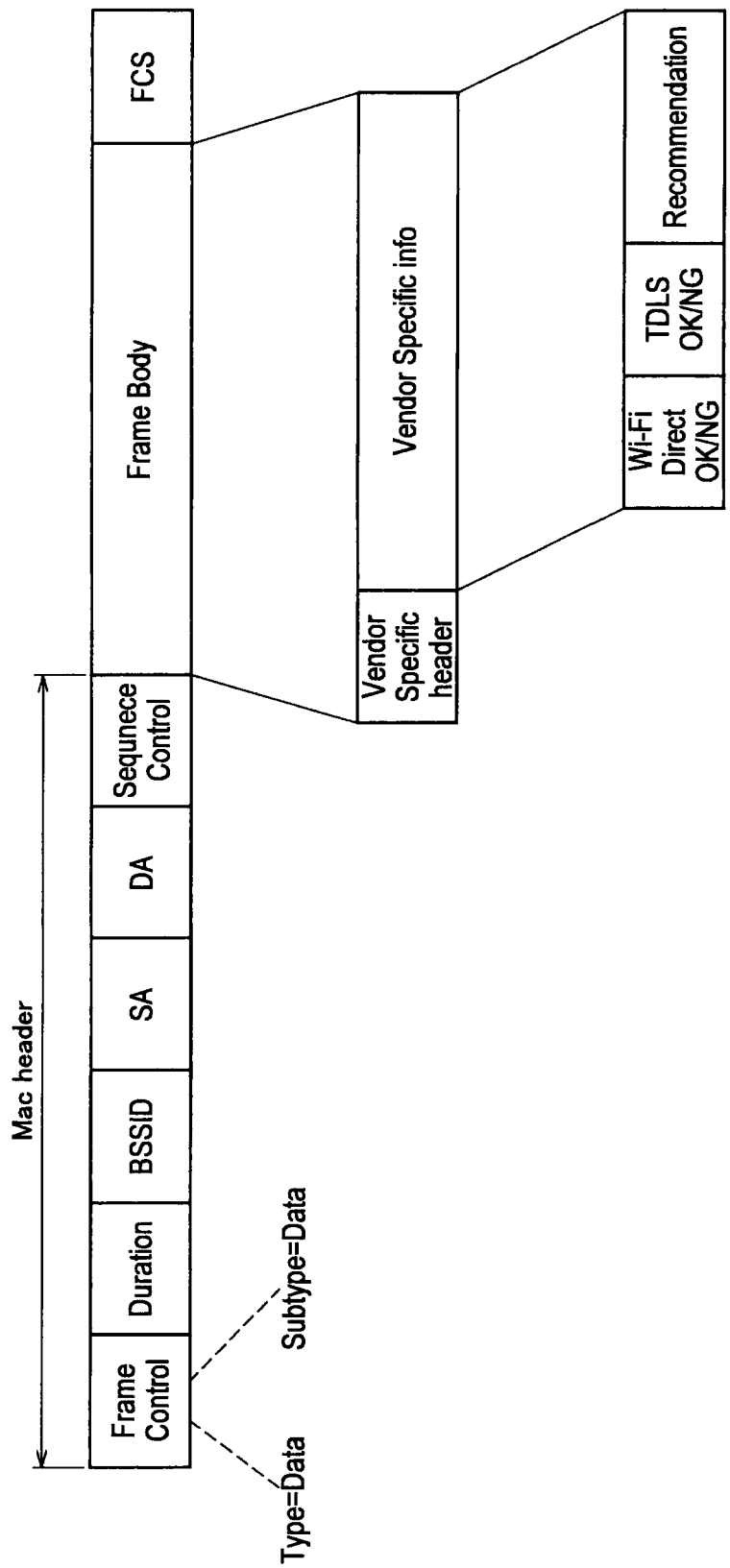
FIG. 13 is an explanatory diagram illustrating an example of Data Frame according to the embodiment.

FIG. 13 is an explanatory diagram illustrating an example of Data Frame. As shown in FIG. 13, in Vender Specific header included in Frame Body of Data Frame, it is indicated that Data Frame differs from a general data packet and it is indicated the type of information. Then, into Vender Specific info, there are inserted information (Wi-Fi Direct OK/NG) indicating whether or not a connection by Wi-Fi Direct is possible, information (TDLS OK/NG) indicating whether or not a connection by TDLS is possible, and information (Recommendation) indicating a recommended connection mode.

Then, as shown in FIG. 7B, the capability of the TV 20 is compared with information indicating a communication capability of the PC 10 (S106). In Step S106, the PC 10 determines an appropriate connection configuration and an appropriate connection mode by comparing the communication capability of the PC 10 with the communication capability of the TV 20, but examples are not limited thereto. For example, the TV 20 may determine an appropriate connection configuration and an appropriate connection mode by comparing the communication capability of the PC 10 with the communication capability of the TV 20.

As a comparison result of Step S106, in the case where the TV 20 is capable of using only TDLS and the PC 10 is capable of using only Wi-Fi Direct, in the case where the TV 20 is capable of using only Wi-Fi Direct and the PC 10 is capable of using only TDLS, or in the case where both the TV 20 and the PC 10 are capable of using neither TDLS nor Wi-Fi Direct, communication via the AP 30 is performed (S130).

Further, as a comparison result of Step S106, in the case where the TV 20 is capable of using both TDLS and Wi-Fi Direct and the PC 10 is capable of using only Wi-Fi Direct, in the case where the TV 20 is capable of using only Wi-Fi Direct and the PC 10 is capable of using both TDLS and Wi-Fi Direct, or in the case where both the TV 20 and the PC 10 are capable of using only Wi-Fi Direct, a connection using Wi-Fi Direct is established (S132). In this case, the PC 10 and the TV 20 use a mechanism of Wi-Fi Direct, and connect with each other after a process in which one of the devices becomes a master device (Group Owner), and hence, data communication between the PC 10 and the TV 20 is performed.

Further, as a comparison result of Step S106, in the case where the TV 20 is capable of using both TDLS and Wi-Fi Direct and the PC 10 is capable of using only TDLS, in the case where the TV 20 is capable of using only TDLS and the PC 10 is capable of using both TDLS and Wi-Fi Direct, or in the case where both the TV 20 and the PC 10 are capable of using only TDLS, a connection using TDLS is established (S134). In this case, the PC 10 connects to the AP 30 (the connection processing can be omitted in the case where the PC 10 is already connected to the AP 30), and data communication between the PC 10 and the TV 20 is performed by using a mechanism of TDLS.

Still further, as a comparison result of Step S106, in the case where both the TV 20 and the PC 10 are capable of using both TDLS and Wi-Fi Direct, whether or not the TV 20 recommends using TDLS is determined (S108). Whether or not the TV 20 recommends using TDLS can be determined by, as described above, using the information of a recommended connection mode inserted into Recommendation included in Probe Response and the like.

In the case where it is determined that the TV 20 recommends using TDLS in Step S108, the connection using TDLS of Step S134 is established. On the other hand, in the case where the TV 20 does not recommend using TDLS, that is, recommends using Wi-Fi Direct, the connection using Wi-Fi Direct of Step S132 is established.

In Step S108, a connection mode is selected depending on which connection mode the TV 20 recommends, but examples are not limited thereto, and the PC 10 may preferentially select a recommended connection mode.

In Step S110 of FIG. 7A, in the case where the PC 10 is not in a state capable of connecting to the AP 30, whether or not the PC 10 is capable of connecting to the AP 30 is selected by a user (S118). In Step S118 of FIG. 7C, whether or not the PC 10 is capable of connecting to the AP 30 is selected by a user, but examples are not limited thereto, and whether or not the PC 10 is capable of autonomously connecting to the AP 30 may be determined by MAC Address Filtering of the AP 30 and the like. For example, in the case where MAC Address of the PC 10 is already registered in the AP 30, it can be determined by MAC Address Filtering that the PC 10 is accessible to the AP 30. Further, the case where the PC 10 is not in a state capable of connecting to the AP 30 also includes the case where the TV 20 and the AP 30 are not connected to each other and the case where the AP 30 is not present. In this case, in Step S118, whether or not the PC 10 is capable of connecting to the AP 30 is not selected by a user, and the processing from Step S120 onward is executed to thereby attempt communication by Wi-Fi Direct.

In Step S118, in the case where it is determined by the user's selection that the PC 10 is capable of connecting to the AP 30, the processing returns to Step S112. On the other hand, in Step S118, in the case where it is determined by the user's selection that the PC 10 is incapable of connecting to the AP 30, the user is persuaded to press a connection trigger of the TV 20 from an input screen or the like of the PC 10 (S120).

Then, a connection start trigger of the TV 20 is pressed in accordance with user operation (S122). In Step S122, after the connection start trigger of the TV 20 is pressed, it is determined whether or not the PC 10 can detect the TV 20 (S124). In Step S124, the TV 20 can be detected by a method defined by Wi-Fi Direct, for example. Then, in the case where it is determined that the PC 10 is compliant with Wi-Fi Direct (S126), a connection using Wi-Fi Direct is established (S132).

In Step S126, in the case where it is determined that the PC 10 is not compliant with Wi-Fi Direct, a connection in another connection mode is established or the user is notified that the connection is failed (S128). In the above, the first operation example has been described. According to the embodiment, it becomes possible to autonomously select a connection configuration (either a connection via the AP 30 or a direct connection) and a connection mode (either TDLS or Wi-Fi Direct) depending on the following: a connection state of the TV 20 which the PC 10 attempts to connect to; a communication capability (Capability) regarding whether or not each of the PC 10 and the TV 20 is capable of using TDLS or Wi-Fi Direct; connection information of the PC 10 and the AP 30; information on which of TDLS and Wi-Fi Direct the TV 20 or the PC 10 recommends; and a selection input depending on user operation.

[4-2] SECOND OPERATION EXAMPLE

Figure 14:
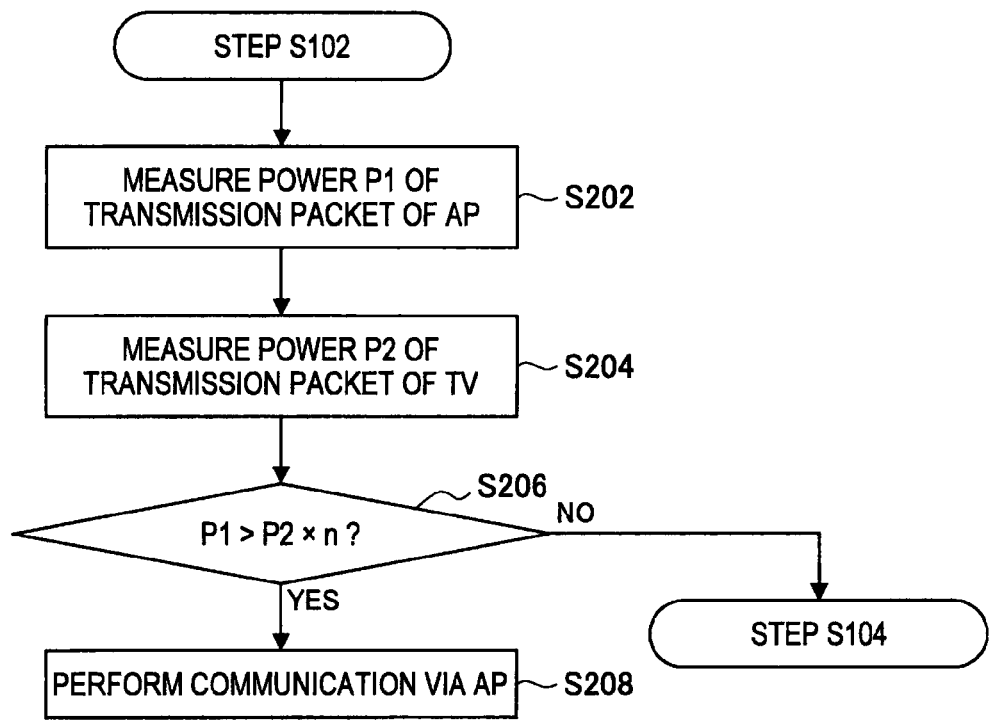
FIG. 14 is a flowchart showing a detail of a second operation example according to the embodiment.

Next, with reference to FIG. 14, a second operation example will be described. In the second operation example, the PC 10 measures radio wave intensities of surrounding radio communication devices such as the TV 20 and the AP 30, to thereby determine whether or not to select a connection via the AP 30.

The second operation example will be described specifically with reference to FIG. 14. FIG. 14 is a flowchart showing a detail of the second operation example. As shown in FIG. 14, in the case where it is determined by Scan that the TV 20 can be detected in Step S102 of FIG. 7A, a power P1 of a transmission packet of the AP 30 is measured (S202). Next, a power P2 of a transmission packet of the TV 20 is measured (S204).

Then, the power P1 measured in Step S202 and the power P2 measured in Step S204 are compared with each other (S206). In Step S206, in the case where the power P1 of the transmission packet of the AP 30 is determined to be n-times larger than the power P2 of the transmission packet of the TV 20, the PC 10 and the TV 20 are not directly connected to each other, and a connection via the AP 30 is selected (S208). Further, in Step S206, in the case where the power P1 of the transmission packet of the AP 30 is not determined to be n-times larger than the power P2 of the transmission packet of the TV 20, the processing from Step S104 of FIG. 7A onward is executed.

Further, a determination condition in Step S206 may be as the following: a case where the power P2 of the transmission packet of the TV 20 is smaller than a predetermined threshold; or a case where the power P1 of the transmission packet of the AP 30 is larger than a predetermined threshold.

[4-3] THIRD OPERATION EXAMPLE

In the above, the second operation example has been described. Next, with reference to FIG. 15 and FIG. 16, a third operation example will be described. In the third operation example, in the case where the TV 20 and the AP 30 are already connected to each other, whether or not it is necessary to continue the connection between the TV 20 and the AP 30 is determined, and the connection is disconnected or continued depending on a determination result.

Figure 15:
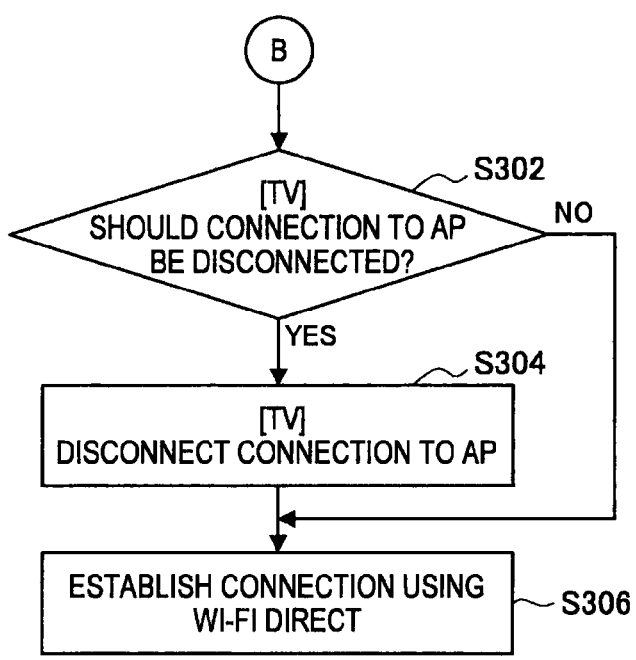
FIG. 15 is a flowchart showing a detail of a third operation example according to the embodiment.

The third operation example will be described specifically with reference to FIG. 15. FIG. 15 is a flowchart showing a detail of the third operation example.

As shown in FIG. 15, in the case where it is determined in FIG. 7B that the connection using Wi-Fi Direct is established (S132), the TV 20 determines whether or not to disconnect the connection to AP 30 (S302). In Step S302, whether or not it is necessary to continue the connection to the AP 30 may be decided depending on the determination of one of or both of an application program which the TV 20 data-communicates with the AP 30 and an application program which the TV 20 data-communicates with the PC 10.

In Step S302, in the case where the TV 20 determines that it is not necessary to continue the connection to the AP 30, the TV 20 disconnects the connection to the AP 30 (S304). Then, after the connection to the AP 30 is disconnected in Step S304, a connection to the PC 10 by Wi-Fi Direct is established (S306). In Step S302, in the case where the TV 20 determines to continue the connection to the AP 30, the processing of Step S306 is executed.

Examples of the case where the TV 20 determines that it is not necessary to continue the connection to the AP 30 includes the case where there is no communication with the AP 30 for a certain period of time and the case where it is determined that the connection to the AP 30 does not have to be continued in accordance with the user's input. Further, the connection between the TV 20 and the AP 30 may be disconnected by the user's input from an operation screen and the like of the PC 10. In this case, the PC 10 notifies the TV 20 that the disconnection between the TV 20 and the AP 30 is designated by the user's input, and the TV 20 disconnects the connection to the AP 30 in accordance with the designation.

Further, whether not to continue the connection to the AP 30 may be determined depending on radio wave interference with respect to the frequency currently used by the TV 20 and the PC 10. For example, when the radio wave interference is measured and in the case where an S/N ratio is low or in the case where a frequency with another access point is overlapped, the connection to the AP 30 is disconnected, because it can be presumed that the communication rate becomes low. In this case, after changing the previously used frequency to another frequency, the connection to the PC 10 by Wi-Fi Direct may be established.

Figure 16:
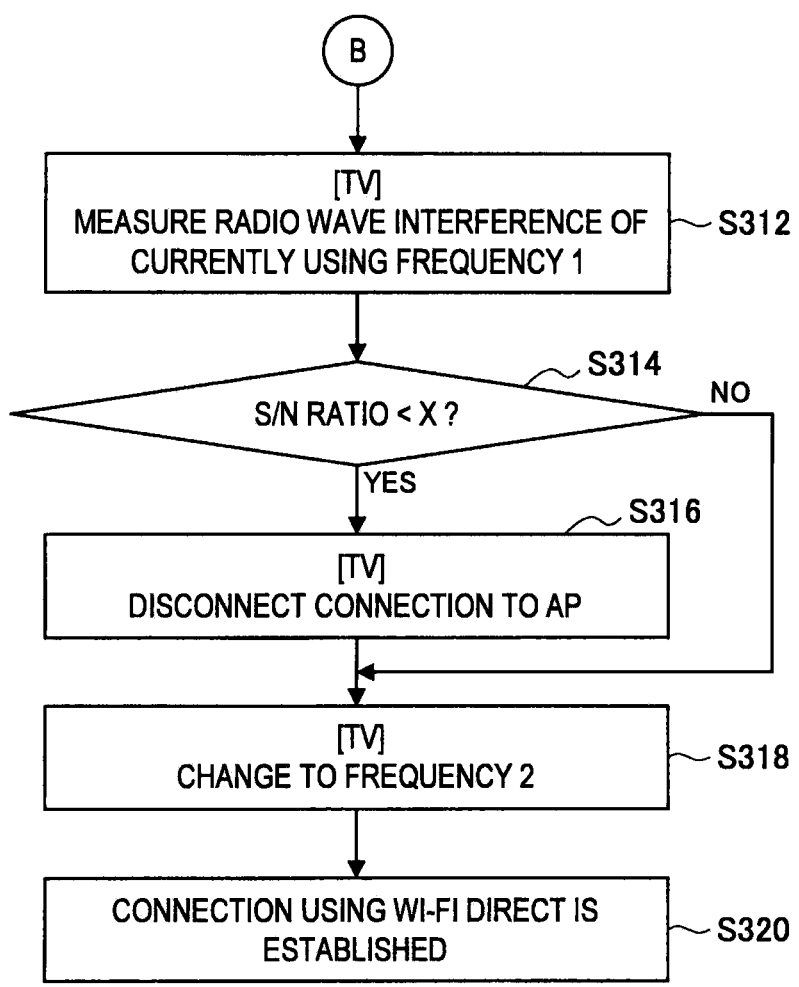
FIG. 16 is a flowchart showing the detail of the third operation example according to the embodiment.

The description will be specifically given with reference to FIG. 16. As shown in FIG. 16, first, the TV 20 measures radio wave interference of a frequency 1 which is currently being used (S312). Then, as a measurement result in Step S312, it is determined whether or not an S/N ratio is smaller than a predetermined value x (S314). In Step S314, in the case where it is determined that the S/N ratio is smaller than the predetermined value x, the connection to the AP 30 is disconnected (S316). Then, the frequency 1 is changed to a frequency 2, which is a different frequency from the frequency 1 (S318), and a connection to the PC 10 using Wi-Fi Direct is established (S320). In Step S314, in the case where it is determined that the S/N ratio is equal to or more than the predetermined value x, the connection to the AP 30 is not disconnected and the processing from Step S318 onward is executed.

In FIG. 16, it is TV 20 that measures radio wave interference and determines whether or not to continue the connection to the AP 30, but examples are not limited thereto. For example, it may be the PC 10 that measures radio wave interference and determines whether or not to continue the connection between the TV 20 and the AP 30. In the case where the PC 10 disconnects the connection between the TV 20 and the AP 30 and determines that it is better to establish a connection at another frequency, the PC 10 notifies the TV 20 of the determination result. The TV 20, which is notified of the determination result, disconnects the connection to the AP 30 and establishes a connection to the PC 10 using Wi-Fi Direct at the frequency which the TV 20 is notified of by the PC 10.

It should be understood by those skilled in the art that various modifications, combinations, sub-combinations and alterations may occur depending on design requirements and other factors insofar as they are within the scope of the appended claims or the equivalents thereof.

In the embodiment above, the PC 10 selects a connection configuration and a connection mode every time the PC 10 connects to the TV 20, but examples are not limited thereto. The PC 10 and the TV 20 may use a connection configuration and a connection mode in the past. For example, a connection configuration and a connection mode in the past between the PC 10 and the TV 20 are stored in the memory 110, and when the PC 10 and the TV 20 are connected to each other again, the PC 10 and the TV 20 may be connected to each other in accordance with the connection configuration and the connection mode stored in the memory 110.

Further, respective steps included in the processing of the radio communication system of the present specification are not necessarily processed in chronological order in accordance with the sequence diagrams. For example, the respective steps included in the processing of the PC 10 and the TV 20 may be processed in different order from the flowcharts, or may be processed in a parallel manner.

Further, there can be also produced a computer program for causing a hardware such as a CPU, a ROM, and a RAM, which is installed in each of the PC 10 and the TV 20, to realize a function equivalent to a function of each component of the PC 10 and the TV 20. Further, there is also provided a storage medium for storing the computer program.

The present application contains subject matter related to that disclosed in Japanese Priority Patent Application JP 2009-266303 filed in the Japan Patent Office on Nov. 24, 2009, the entire content of which is hereby incorporated by reference.

What is claimed is:

1. A radio communication device comprising:
    a determination unit which determines connection processing, for connecting another radio communication device, activated in accordance with a first input operation by a user of the radio communication device;
    a reception unit which receives information indicating a connection state or a communication capability of such other radio communication device to which the radio communication device attempts to connect; and
    a selection unit which selects, depending on the information received by the reception unit, which communication is to be performed from among
        first connection mode in which a direct connection to such other radio communication device is established and direct communication with such other radio communication device is performed, without utilizing a connection to a base station, wherein the determination unit determines, when such other radio communication device and the base station are already connected to each other, whether to perform the first connection mode by disconnecting the connection between such other radio communication device and the base station in accordance with a second input operation by the user of the radio communication device,
        second connection mode in which a connection to such other radio communication device via the base station that relays radio communication is established and direct communication with such other radio communication device is performed, and
        third connection mode in which a connection to such other radio communication device via the base station is established and indirect communication with such other radio communication device via the base station is performed,
    wherein the determination unit, the reception unit, and the selection unit are each implemented via at least one processor.

2. The radio communication device according to claim 1, further comprising
    an acquisition unit which acquires information indicating a connection state or a communication capability of the radio communication device,
    wherein the selection unit selects, depending on the information received by the reception unit and the information acquired by the acquisition unit, which of the first connection mode, the second connection mode, and the third connection mode is to be performed.

3. The radio communication device according to claim 1, wherein the information indicating a communication capability is information of a connection mode which is usable by such other radio communication device.

4. The radio communication device according to claim 1, wherein the information indicating a communication capability is information of a connection mode which is recommended by such other radio communication device.

5. The radio communication device according to claim 1, wherein the determination unit determines, when such other radio communication device and the base station are already connected to each other and the first connection mode is selected by the selection unit, depending on the information indicating a connection state of such other radio communication device, whether to perform the first connection mode by disconnecting the connection between such other radio communication device and the base station or to perform the first connection mode without disconnecting such connection.

6. The radio communication device according to claim 5, wherein the determination unit determines whether to perform the first connection mode by using a frequency different from a frequency used in communication between the radio communication device and the base station, depending on the information indicating a connection state of such other radio communication device.

7. The radio communication device according to claim 1, wherein the information indicating a connection state is information of a connection state in the past between such other radio communication device and the radio communication device.

8. The radio communication device according to claim 7, wherein the information of a connection state in the past is information of whether or not an encryption key used for connecting to such other radio communication device is already set.

9. The radio communication device according to claim 1, wherein the information indicating a connection state is information of a current connection state between such other radio communication device and the radio communication device.

10. The radio communication device according to claim 1, wherein the information indicating a connection state is information of a radio wave intensity transmitted from such other radio communication device and a radio wave intensity transmitted from the base station.

11. The radio communication device according to claim 1, wherein the information indicating a connection state is information of a measurement result of interference with respect to a frequency being used by such other radio communication device or the radio communication device.

12. The radio communication device according to claim 1, wherein the information indicating a connection state is request information of an application program being used by such other radio communication device or the radio communication device.

13. The radio communication device according to claim 1, wherein the acquisition unit acquires connection information by regular broadcast-transmission from any radio communication device.

14. The radio communication device according to claim 1, wherein the reception unit receives the information which is inserted into Probe Request or Probe Response defined by IEEE 802.11.

15. The radio communication device according to claim 1, wherein the reception unit receives the information which is inserted into a beacon defined by IEEE 802.11.

16. The radio communication device according to claim 1, wherein the reception unit receives the information which is inserted into Action Frame or Public Action Frame defined by IEEE 802.11.

17. The radio communication device according to claim 1, wherein the reception unit receives the information which is inserted into information of a higher-level layer of a layer 3 or above which is performed through Data Frame defined by IEEE 802.11.

18. A radio communication system comprising:
a first radio communication device; and
a second radio communication device,
wherein the first radio communication device includes
    a determination unit which determines connection processing, for connecting the second radio communication device, activated in accordance with a first input operation by a user of the first radio communication device;
    a reception unit which receives information indicating a connection state or a communication capability of the second radio communication device, and
    a selection unit which selects, depending on the information received by the reception unit, which communication is to be performed from among
        first connection mode in which a direct connection to the second radio communication device is established and direct communication with the second radio communication device is performed, without utilizing a connection to a base station, wherein the determination unit determines, when the second radio communication device and the base station are already connected to each other, whether to perform the first connection mode by disconnecting the connection between the second radio communication device and the base station in accordance with a second input operation by the user of the first radio communication device,
        second connection mode in which a connection to the second radio communication device via the base station is established and direct communication with the second radio communication device is performed, and
        third connection mode in which a connection to the second radio communication device via the base station is established and indirect communication with the second radio communication device via the base station is performed.

19. A non-transitory computer-readable medium having embodied thereon a program, which when executed by a processor of a radio communication device causes the radio communication device to perform a method, the method comprising:
determining connection processing, for connecting another radio communication device, activated in accordance with first input operation by a user of the radio communication device;
receiving information indicating a connection state or a communication capability of such other radio communication device which the radio communication device attempts to connect to, and
selecting, depending on the received information, which communication is to be performed from among
    first connection mode in which a direct connection to such other radio communication device is established and direct communication with such other radio communication device is performed, without utilizing a connection to a base station, wherein when such other radio communication device and the base station are already connected to each other, it is further determined whether to perform the first connection mode by disconnecting the connection between such other radio communication device and the base station in accordance with a second input operation by the user of the radio communication device,
    second connection mode in which a connection to such other radio communication device via the base station is established and direct communication with such other radio communication device is performed, and
    third connection mode in which a connection to such other radio communication device via the base station is established and indirect communication with such other radio communication device via the base station is performed.

20. A radio communication method of a radio communication device, the method comprising the steps of:
- determining connection processing, for connecting another radio communication device, activated in accordance with an input operation by a user of the radio communication device;
- receiving information indicating a connection state or a communication capability of such other radio communication device which the radio communication device attempts to connect to; and
- selecting, depending on the received information, which communication is to be performed from among
  - first connection mode in which a direct connection to such other radio communication device is established and direct communication with such other radio communication device is performed, without utilizing a connection to a base station, wherein when such other radio communication device and the base station are already connected to each other, it is further determined whether to perform the first connection mode by disconnecting the connection between such other radio communication device and the base station in accordance with a second input operation by the user of the radio communication device,
  - second connection mode in which a connection to such other radio communication device via the base station is established and direct communication with such other radio communication device is performed, and
  - third connection mode in which a connection to such other radio communication device via the base station is established and indirect communication with such other radio communication device via the base station is performed.

* * * * *